United States Patent
Becker et al.

(10) Patent No.: US 8,607,311 B2
(45) Date of Patent: Dec. 10, 2013

(54) DELEGATION IN LOGIC-BASED ACCESS CONTROL

(75) Inventors: Moritz Y. Becker, Cambridge (GB); Blair B. Dillaway, Clyde Hill, WA (US); Gregory D. Fee, Seattle, WA (US); John M. Leen, Seattle, WA (US); Jason F. Mackay, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1350 days.

(21) Appl. No.: 11/962,761

(22) Filed: Dec. 21, 2007

(65) Prior Publication Data

US 2009/0165110 A1    Jun. 25, 2009

(51) Int. Cl.
  *G06F 7/04* (2006.01)
  *G06F 17/30* (2006.01)
  *G06F 12/00* (2006.01)
  *H04L 29/06* (2006.01)

(52) U.S. Cl.
  USPC ............. 726/4; 726/2; 726/3; 707/999.001; 707/999.002; 707/999.009; 707/999.01

(58) Field of Classification Search
  USPC .............. 713/151, 201; 707/9, 781–783, 707/999.001–999.01; 726/1–4, 16–17, 726/26–28
  See application file for complete search history.

(56) References Cited

U.S. PATENT DOCUMENTS

| | | | |
|---|---|---|---|
| 5,649,099 A | 7/1997 | Theimer et al. | |
| 5,712,960 A | 1/1998 | Chiopris et al. | |
| 5,812,994 A | 9/1998 | Imlah | |
| 6,883,034 B1 | 4/2005 | Pelavin et al. | |
| 6,910,003 B1 | 6/2005 | Arnold et al. | |
| 6,925,443 B1 | 8/2005 | Baggett, Jr. et al. | |
| 6,941,471 B2 | 9/2005 | Lin | |
| 6,952,737 B1 | 10/2005 | Coates et al. | |
| 7,120,635 B2 * | 10/2006 | Bhide et al. ........................ | 1/1 |
| 7,184,985 B2 | 2/2007 | DeTreville | |
| 7,260,831 B1 | 8/2007 | Beznosov et al. | |
| 7,505,970 B2 | 3/2009 | Adya et al. | |
| 7,734,662 B2 * | 6/2010 | Rowley et al. ............... | 707/803 |
| 8,010,560 B2 | 8/2011 | Becker et al. | |
| 2002/0116647 A1 | 8/2002 | Mont et al. | |
| 2003/0037263 A1 | 2/2003 | Kamat et al. | |
| 2004/0215642 A1 * | 10/2004 | Cameron et al. ............. | 707/100 |

(Continued)

OTHER PUBLICATIONS

"Abductive Reasoning", Reference.com. Wikipedia, the free encyclopedia, http://www.reference.com/browse/wiki/Abductive_reasoning, 2007.

(Continued)

*Primary Examiner* — Tae Kim

(57) ABSTRACT

Access to a resource may be controlled by a policy, such that a request to access the resource is either granted or denied based on what assertions have been made by various principals. To find the assertions that support a grant of access to the resource, a template may be created that defines the nature of assertions that would cause access to succeed. Assertions may be stored in the form of tokens. The template may be used to search an existing token store to find assertions that have been made, and/or to generate assertions that have not been found in the token store and that would satisfy the template. The assertions in the template may be created by performing an abductive reasoning process on an access query.

19 Claims, 14 Drawing Sheets

(56) References Cited

U.S. PATENT DOCUMENTS

| | | | |
|---|---|---|---|
| 2004/0243576 A1* | 12/2004 | Shrivastava et al. | 707/5 |
| 2005/0021498 A1* | 1/2005 | Boreham et al. | 707/1 |
| 2005/0043932 A1 | 2/2005 | Cardelli et al. | |
| 2005/0086540 A1 | 4/2005 | Gunter et al. | |
| 2006/0005227 A1 | 1/2006 | Samuelsson et al. | |
| 2006/0031762 A1* | 2/2006 | Takashima | 715/517 |
| 2006/0112048 A1 | 5/2006 | Talbot et al. | |
| 2006/0206925 A1 | 9/2006 | Dillaway et al. | |
| 2006/0253700 A1 | 11/2006 | Della-Libera et al. | |
| 2006/0256953 A1 | 11/2006 | Pulaski et al. | |
| 2007/0094216 A1 | 4/2007 | Mathias et al. | |
| 2007/0203881 A1 | 8/2007 | Schaad et al. | |
| 2007/0289024 A1 | 12/2007 | Mohammed | |

OTHER PUBLICATIONS

"Charles Sanders Peirce, Deduction, Induction, and Abduction", http://.plato.stanford.edu/entries/peirce/#dia, Jul. 26, 2006.

"OASIS eXtensible Access Control Markup Language (XACML) TC ", www.oasis-open.org/committees/xacml, Jun. 28, 2007.

Bandara, et al., "Toward a Formal Characterization of Policy Specification & Analysis", pp. 1-9, 2007.

Becker Moritz Y., "Cassandra: flexible trust management and its application to electronic health records", Date: Oct. 2005, pp. 1-214.

Becker, et al., "Design and Semantics of a Decentralized Authorization Language", pp. 1-13, 2007.

Becker, et al., "SecPAL: Design and Semantics of a Decentralized Authorization Language", Date: Sep. 2006, pp. 1-33.

Becker, et al., "The Role of Abduction in Declarative Authorization Policies", Date: Aug. 2007, pp. 1-21.

Bonatti, et al., "Advanced Policy Explanations on the Web", pp. 1-5, 2007.

Canovas, et al., "Delegation in Distributed Systems: Challenges and Open Issues", Proceedings of the 14th International Workshop on Database and Expert Systems Applications (DEXA'03), Date: 2003, pp. 1-5.

Chleq Nicolas, "Constrained Resolution and Abducttve Temporal Reasoning", http://www.blackwell-synergy.com/doi/abs/10.1111/j.0467-8640.1996.tb00268.x?journalCode=coin.

De Treville John, "Binder, a Logic-Based Security Language", Date: 2002, pp. 1-9.

Dillaway Blair, "A Unified Approach to Trust, Delegation, and Authorization in Large-Scale Grids", Date: Sep. 2006, pp. 1-24, Microsoft Corporation, Redmond, WA.

Dillaway, et al., "Security Policy Assertion Language (SecPAL) Specification", Date: Feb. 15, 2007, pp. 1-51.

Humphrey, et al., "Fine-Grained Access Control for GridFTP using SecPAL", Preliminary version; to appear in 8th IEEE/ACM International Conference on Grid Computing (Grid 2007), Date: Sep. 19-21, 2007, pp. 1-9.

Kakas Antonis, "Integrating Abduction and Constraint Solving", Date: 2000, pp. 1-7.

Kakas, et al., "Reasoning Techniques for Analysis and Refinement of Policies for Service Management", Date: 2005, pp. 1-64.

Kakas, et al., "The Role of Abduction in Logic Programming", pp. 1-80, 2007.

Koshutanski, et al., "Abduction and Deduction in Logic Programming for Access Control for Autonomic Systems", Date: Jun. 2005, pp. 1-40.

Koshutanski, et al., "E Pluribus Unum", Date: 2005, pp. 179-190.

Koshutanski, et al., "Interactive Access Control for Web Services", pp. 1-16, 2007.

Kotenko, et al., "The Event Calculus Implementation Using ILOG JRules for Security Policy Verification", pp. 1-4, 2007.

Li, et al., "A Logic-based Knowledge Representation for Authorization with Delegation (1999)", Proceedings of the 12th IEEE Computer Security Foundations Workshop, Date: Jun. 1999, pp. 1-14.

Nikita Borisov, "Active Certificates: A Framework for Delegation", Date: 2002, pp. 1-32.

Ninghui Li, "Delegation Logic: A Logic-based Approach to Distributed Authorization", Date: Sep. 2000, pp. 1-116.

Thagard, et al., "Abductive Reasoning: Logic, Visual Thinking, and Coherence", http://cogsci.uwaterloo.ca/Articles/Pages/%7FAbductive.html.

Turner Christopher, "Constraint Based Reasoning with Constraint Logic Programming and Array Based Logic", Date: Nov. 1996, pp. 1-37.

* cited by examiner

DELEGATION IN LOGIC-BASED ACCESS CONTROL

CROSS-REFERENCE TO RELATED APPLICATIONS

This application is related to the commonly assigned application entitled "Abducing Assertion to Support Access Query", Ser. No. 11/962,746, filed on Dec. 21, 2007 (now U.S. Pat. No. 8,010,560).

BACKGROUND

An access control system enforces a policy that governs access to a resource. For a given principal (e.g., a user named "Joe") and a given resource (e.g., a file named "foo.txt"), an access control system may determine whether Joe can access foo.txt.

Access rights may be obtained by way of delegation from one or more principals. For example, the authority over the resource, and/or the policy enforced by a guard that controls access to the resource, may give one or more principals the right to grant access rights to other principals. In some cases, the relationships that the policy defines among principals, and between the principals and the resource, may be complex. When these relationships are complex, it may not be clear to a human what delegations would support a goal of allowing a particular principal access to a resource. Logic-based security models, such as the Security Policy Assertion Language ("SecPAL") enable complex policies over a resource to be created and enforced. For example, the security policy over the file foo.txt may grant a principal (e.g., a user named "Joe") the right to allow another principal the right to read foo.txt, as long as such other principal is a member of a particular group (e.g., "Group 1"). That same policy may grant to another principal (e.g., a user named "Susan") the right to assign principals membership in Group 1. Another policy may call for access rights to be time-limited—e.g., perhaps the policy allows Joe to give another principal the right to read foo.txt, but calls for any such rights to expire no more than one hour from the time the delegation is made. In this example, achieving the goal of allowing Bob to access foo.txt involves delegative action by two users (Joe and Susan), and also involves knowing the current time.

When the policy governing access to a resource is defined by a complex set of rules, it may be difficult to know what assertions (such as delegations or other credentials) are to exist if an access request is to be granted. An access request may fail because one does not know what delegations are to be made to satisfy the access policy. Moreover, even if one determines what delegations would satisfy the policy, one may not know what delegations have already been made or could be made.

SUMMARY

The decision to allow access to a resource may be based on the existence of delegations and/or other facts. These delegations and/or other facts can be located and/or created in order to cause access to be allowed.

Delegations may take the form of assertions made by principals. These assertions may be stored in the form of tokens. For example, "Joe says Bob can read foo.txt" is an assertion made by Joe about Bob's right to read foo.txt. A token based on this assertion may contain the assertion and the digital signature of the asserter. These assertions may be stored, for example, in one or more local and/or global token stores. A template may be created that describes the nature of assertions that, if made, would satisfy the access request. The template can be used to search the token store to find tokens that satisfy the assertions. If the tokens are not in the token store, the template can also be used to determine whether tokens that satisfy the assertions can be created.

The template may specify assertions that involve constants and/or variables. For example, "Joe says Bob can read foo.txt" is an assertion that might be specified by the template. That assertion involves three constants ("Joe", "Bob", and "foo.txt"). "Susan says Bob is a member of group %A" is an example of an assertion that involves two constants ("Susan" and "Bob"), and one variable ("%A"). When the template contains assertions that involve a variable, the template may also contain a set of constraints on the values that the variable could take on in an actual assertion in order to support the goal of access. For example, if the policy calls for any principal that accesses foo.txt to be a member of "Group 1", then the template can specify the constraint that "%A matches 'Group 1'". The template may be represented in an extensible Markup Language (XML) form that follows a defined schema. However, a template may take any form, and may contain any type of information.

The assertions in a template may be generated using an abductive reasoning process on the query that defines an access request evaluated against an expected authorization context (input assertions, resource access control policy, and environmental conditions). Thus, a query that asks if Bob is allowed to read foo.txt may be provided to a service that determines, based on an authorization context appropriate for the resource foo.txt, what assertions would support the success of the query. This abductive reasoning process can be used to manufacture a template, and then tokens that satisfy the assertions in the template can be located and/or created. However, any process of creating a template may be used.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
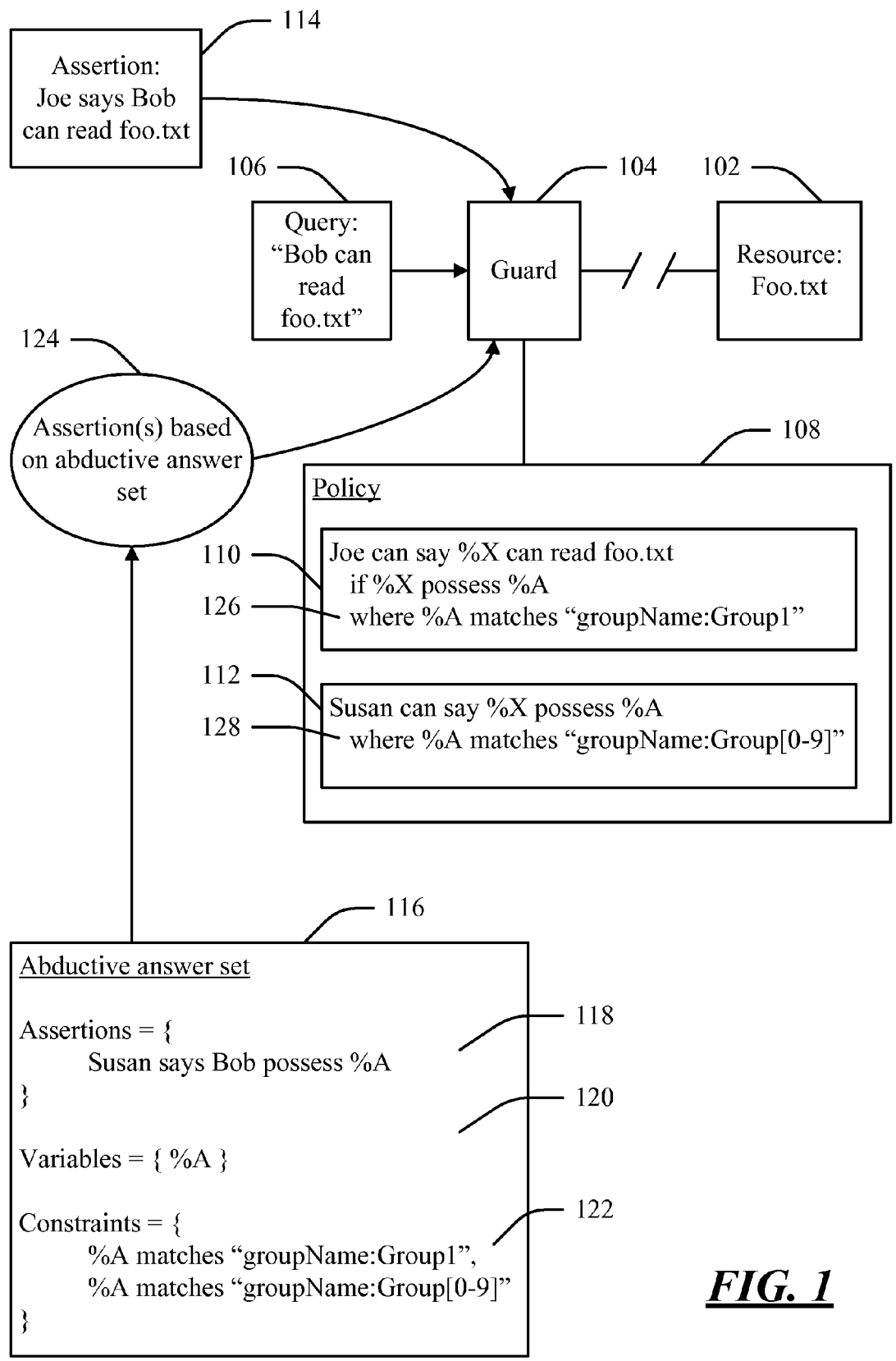
FIG. 1 is a block diagram of a scenario in which an access decision may be made.

When a policy controls access to a resource, the policy may call for access to be either granted or denied based on what facts exist. These facts, for example, may take the form of assertions made by principals, such as "Joe says Bob can read foo.txt", or "Susan says Bob is a member of Group 1". When an access request is to be granted, or has already failed due to the non-existence of the relevant assertions, a template can be created that defines the types of assertions that would support success of the access request. This template can be used to search for and/or generate the relevant assertions to cause access to succeed.

One way to generate the template is to perform an abductive reasoning process on the query that seeks access to the resource. The template can also be generated in other ways (e.g., by hand, by a different type of reasoning process, etc.). However, before turning to the use of template, the use of logic-based security policies, and an example abductive reasoning process, are first described below and with reference to FIGS. 1-8.

An access control policy defines the circumstances under which an action may be performed on a resource. Thus, given a principal P, an action A, a resource R, and a set of facts, an access control policy determines whether P can perform A on R. For example, if P is a user named "Bob", A is the action "read", and R is a file named "foo.txt", the question "May Bob read foo.txt?" can be answered under the policy that governs access to the file (or file system, or other resource). The policy may contain facts that express what permissions (e.g., read, write, execute, etc.) and/or attributes (e.g., user-id, group-id, etc.) a principal is associated with, and who has asserted these facts. For example, the policy may contain the fact "Joe says Bob can read foo.txt", stating that foo.txt can be read by Bob, according to Joe. This rule is a simple fact: it is not conditioned on the provability of other facts. In more complex scenarios, determining whether Bob can read foo.txt may involve other facts. For example, the policy may contain a rule that states that Joe grants Bob read permission as long as Susan assigns Bob the attribute of membership in a group named "Group1". In this case, the access decision is conditioned on whether Susan has assigned that attribute to Bob, which would typically be communicated via a security credential associated with a given access request. Policy rules may also specify constraints that have to be satisfied. For example, Joe may have granted Bob permission to read foo.txt until Jan. 1, 2009, in which case the permission is constrained by the current date.

A logic-based security system uses formal logic as a model for making access decisions. In such a system, whether access to a resource will be granted is determined by an access query. The query is a statement that can be either true (access granted) or false (access denied). Thus, a query as to whether Bob will be allowed to read foo.txt might take the form: "Bob can read foo.txt." This query is a statement that can be either true or false. If the statement is true, then Bob is allowed to read foo.txt. If the statement is false, then Bob is not allowed to read foo.txt. The Security Policy Assertion Language (Sec-PAL) is one example of a system that uses formal logic with constraints as a paradigm for modeling access decisions, although there are other mechanisms to implement that paradigm.

Whether a particular query evaluates to true or false depends on the policy rules and the facts. The facts and rules constitute a universe of information in which the truth of a statement can be judged. Thus, the policy that governs access to the resource may take the form of a set of rules. The facts in the system may be statements that have been asserted by principals. Thus, "Joe can say <anyone> can read foo.txt" is an example of a rule that could govern access to foo.txt. This rule does not give any principal in particular the right to read foo.txt, but says that Joe can give a principal that right. Thus, the rule itself is not sufficient to demonstrate that the statement "Bob can read foo.txt" is true. However, Joe could make the assertion: "Joe says Bob can read foo.txt". If Joe has made this assertion, then the existence of the assertion is a fact that is available to support the truth of the query. In the presence of this fact, the statement "Bob can read foo.txt" is true under the rule. Thus, in this example, the assertion constitutes a complete proof of the query, since it constitutes the fact that makes the query statement true under the rule. If the rule(s) permit a time-constrained authorization to read foo.txt, and if Joe had asserted "Bob can read foo.txt until Jan. 1, 2009", then the query "Bob can read foo.txt" could be determined to be true or false using both that assertion and the additional information about the current date.

In distributed computing environments, principals accessing a resource may have limited knowledge about the access control policy for that resource. Even if they do have full knowledge of the policy, in a rich logic-based security language, it may be possible to write an access policy for which it is not obvious to a human observer what set of facts would cause a query to be true under the policy. This creates a potential problem for the accessing principal. If they wish to gain access to a resource it may be difficult to determine what security assertions they need to provide along with their access request. Similarly, if they wish to delegate their access rights to another principal it may be difficult to determine the appropriate delegation assertions to provide. For example, if one wants to allow Bob to read foo.txt (i.e., if one wants the query "Bob can read foo.txt" to be true), then one may want to figure out what set(s) of facts, if they existed, would cause that statement to be true. Abduction can be used to suggest such a set (or sets) of facts. This approach is generally applicable to both direct access and rights delegation by a principal.

In logic, deduction is the process of deriving one or more conclusions from a set of rules and facts. For example, suppose a universe has the rule "The grass is wet if it is raining" and the fact "it is raining." (In formal logic, "raining" and "grass is wet" might be considered predicates, and the rule might be stated formally as "raining implies grass is wet.") In this example, the conclusion "grass is wet" can be deduced from the fact "it is raining". Since the fact "it is raining" is true, it is also known—within the facts and rules of this example universe—that "grass is wet" is also true. Thus, "grass is wet" is now a fact, one which is deduced from the existing rule and facts of the universe. With abduction, a conclusion (or observation) fact is given and possible facts to explain the conclusion or observation are derived. Thus, if one concludes that the grass is wet, one can use abductive reasoning to identify possible facts that, if true, would lead to that conclusion. While there is a rule that states that "raining implies grass is wet", there is no rule stating that "grass is wet implies raining". Thus, in this example, "raining" cannot be deduced from the conclusion "grass is wet." However, when one considers both the conclusion "grass is wet" and the rule "raining implies grass is wet," it can be abduced that "raining" is a possible explanation for "grass is wet." If "raining" turns out to be true, then, within this example universe, that fact explains "grass is wet." If one adds an additional rule to the universe such as "sprinklers on implies grass is wet", then it is easy to see that abducing a possible fact is not the same as knowing the fact to be true. In this modified universe, "grass is wet" can be explained either by "sprinklers on" or "raining." Either fact would lead to the conclusion that "grass is wet," but abductive reasoning in this example does not prove that either explanation is a true fact.

When access control is modeled as a logic system, abductive reasoning can be used to determine what facts, if present, would cause an access query to evaluate to true. In a logic-based access control system, facts may take the form of assertions made by particular principals. Thus, "Joe says Bob can read foo.txt" is an example of a fact believed by Joe (or at least asserted by Joe). In such a system, if one wishes for principal P to be allowed to access resource R, abductive reasoning can be used to identify those assertions that would cause the query "P can access R" to evaluate to true. The relevant assertions can then potentially be provided by retrieving from a data remembrance system or by manufacturing them either automatically or through user interaction. For example, it could be abduced that the assertion "Joe says Bob can read foo.txt" would cause the query "Bob can read foo.txt" to be true. The assertion "Joe says Bob can read foo.txt" may or may not exist, but, having abduced that assertion from the query, one can take the appropriate measures to find out if the assertion has already been made outside the context under consideration (e.g., assertions that have been made could be stored in a remote token store), or can attempt to get Joe to make the assertion if it has not already been made. In this sense, abduction can be used to proactively find the assertions that may be made in order to support the truth of the access query, or to debug an access failure.

The examples herein often use the names of people to identify principals. However, in many cases principals are automata (e.g., machines, devices, services, software, etc.) that participate in a complex web of relationships through which authorization to access a resource is granted. Thus, understanding what assertions would cause an access query to be true can assist in programming these automata to make the right assertions so that particular principals can gain access to a resource. For the purpose of explanation, principals, in the examples herein, will continue to have people's names. However, it will be understood that principals can be people, programs, machines, etc., and the mechanisms described herein can be deployed in a system with any type of actors.

Turning now to the drawings, FIG. 1 shows a scenario in which an access decision may be made. Resource 102 is a resource that a principal may be able to access. Resource 102, in the example of FIG. 1, is a file named "foo.txt", although resource 102 could be any type of resource, such as a device, peripheral, processor, etc. Guard 104 is a gatekeeper for resource 102. Thus, when access to resource 102 is requested by or on behalf of a principal, guard 104 decides whether access is to be granted or denied. Guard 104 can be implemented as software, hardware, etc., or any combination thereof.

The desired access to resource 102 is represented by the query 106 and would be formulated based on the access request received by the Guard. An access request represents a desired operation on a resource (i.e., open a file for read) and reflects the resource's interface. The request typically has associated information allowing the requestor's identity to be authenticated and may contain one or more security tokens containing other security assertions. This may be mapped by the guard into one or more queries which reflect the access model of the policy system. In this example, query 106 is "Bob read foo.txt."

It is noted at this point that the examples used herein request "read" access to a resource. However, any type of access (e.g., write access, execute access, etc.) could be requested, and the subject matter described herein encompasses any type of access request.

Moreover, before continuing with a discussion of FIG. 1, the following is an explanation of some terminology and syntax used in the examples. The example of FIG. 1 and the subsequent examples use an English-like representation of SecPAL to express facts, policies, and queries. The subject matter herein is not limited to the SecPAL system and language. However, SecPAL, and its English-like representation, provide a convenient way to describe examples of logical statements in an access-control setting. In these examples, facts and rules use the verbs "can read," "possess," and "can say." In the language of formal logic, a statement such as "A can read B" might be written as "can_read(A,B)", with "can_read" as the predicate and "A" and "B" as the constants or variables to which the predicate applies. As to the other verbs used in the examples, the "possess" verb is used to assign attributes to principals and the "can say" verb is used to express trust and/or delegation relationships. For example, the statement "David says Bob can read foo.txt" has no particular significance in evaluating Bob's right to read foo.txt under a policy, unless David has been given the authority (either directly or indirectly) to make this statement. That is, the Guard trusts facts of this type asserted by David. This delegation could be made in the relevant policy through a "can say" verb. Thus, a rule such as "David can say Bob can read foo.txt" may be part of the policy. Moreover, the examples use the additional keywords "says" and "matches". "Says" indicates which principal has made an assertion, and "A matches B" is a Boolean expression that evaluates to true or false depending on whether string A matches the regular expression B. As part of the syntax used in the examples, variable names begin with the percent sign ("%"), so "% A" and "% X" in the examples are variables.

Returning now to FIG. 1, guard 104 implements a policy 108 to control access to resource 102. Guard 104 evaluates query 106 with reference to policy 108. Policy 108 comprises two rules 110 and 112. Rule 110 says "Joe can say % X can read foo.txt if % X possess % A where % A matches 'groupName:Group1'". This rule states that Joe has the authority to give another principal (indicated by the variable % X) the right to read foo.txt, as long as that principal possesses the attribute indicated by variable % A. Rule 110 further specifies that % A matches "groupName:Group1", as a constraint on the value of % A. (The rule that grants Joe this right could be expressed as a constrained delegation from the authority over the resource. Thus, rules might begin with "Authority says," so rule 110 could be written as "Authority says Joe can say % X can read foo.txt . . . ." In such a case, the query to determine if Bob can read foo.txt could be written as "Authority says Bob can read foo.txt," thereby asking whether the Authority over the resource foo.txt has granted Bob the right to read it though delegations recognized by the rules. For the purpose of the examples herein, rules and queries are written without "Authority says . . . " but it will be understood that rules can be written as assertions made by a principal. The techniques described herein could be used to abduce a proof of "Authority says Bob can read foo.txt" by the same mechanisms used to abduce a proof of "Bob can read foo.txt". For that matter, these techniques can be used to abduce a proof of any arbitrary fact or assertion, such as "A says B verb % C, where % C satisfies Constraint.")

The "possess" verb expresses an association between a principal and an attribute, such as the principal's e-mail address, group, etc. Rule 110 allows Joe to give another principal the right to read foo.txt, as long as the principal possesses the attribute "groupName:Group1" (i.e., as long as the principal is a member of "Group1"). Rule 110 does not give Joe the power to assign an attribute, such as group membership, to a principal. The manner of acquiring group membership that will be recognized under policy 108 is specified by rule 112.

Rule 112 says "Susan can say % X possess % A where % A matches 'groupName:Group[0-9]'". (Again, this rule could have been written as "Authority says Susan can say . . . .") In a regular expression, the string "[$c_1$-$c_2$]" matches any character in the range $c_1$ and $c_2$, so this rule states that Susan has the authority to assign a principal an attribute of the form "groupName:Group0", "groupName:Group1", etc. Thus, Susan can assign a principal membership in any group from Group0 through Group9.

Under rules 110 and 112, the answer to whether Bob can read foo.txt is determined based on two facts: whether Joe has allowed Bob to read foo.txt, and whether Susan has given Bob membership in Group1.

Assertion 114 is an assertion that has been made by Joe. Thus, the assertion "Joe says Bob can read foo.txt" is a fact that can be used in evaluating query 106. As explained above, this assertion alone is not sufficient to satisfy policy 108, since this assertion does not establish that Bob possesses the attribute "groupName:Group1". Abductive reasoning could be used to compute the missing assertion from query 106, policy 108, and assertion 114. That is, given information that comprises (a) a policy under which the reasoning is to take place, (b) a set of additional assertions to include with the policy (representing any additional information to be considered by the guard, and which could be the empty set), and (c) a query, one can use abductive reasoning on this information to determine what other assertions, if made, would support a finding that the query is true. A mechanism to perform such abductive reasoning is described below in connection with subsequent figures, such as FIG. 3. However, for the purpose of FIG. 1, it is assumed that such an abductive reasoning process has taken place and has yielded abductive answer set 116.

Abductive answer set 116 comprises assertion set 118, variable set 120, and constraint set 122. Assertion set 118 comprises one or more assertions that could be made in combination with assertion 114 to cause query 106 to be true under policy 108. (The assertions in assertion set 118 may be referred to as "assumptions", and assertion set 118 may be referred to as an "assumption set.") Variable set 120 comprises a collection of variables, if any, that are used in assertion set 118. Constraint set 122 comprises constraints, if any, on the variables in variable set 120. In this example, assertion set 118 contains the assertion "Susan says Bob possess % A". This assertion contains a variable (% A), which is listed in variable set 120. Constraint set 122 lists the constraints that variable % A is to meet if the assertion contained in assertion set 118 is to satisfy the missing assertion. Constraint set 122 contains two constraints on what value % A is to assume. Since both rules 110 and 112 are to be satisfied in order for query 106 to be true, these constraints are derived from the constraints 126 and 128 on variable % A that are specified in rules 110 and 112, respectively. In one optimization, it might be discovered the first constraint implies the second one and thus renders the second one superfluous—i.e., "% A matches 'groupName:Group[0-9]'" is true whenever "% A matches 'groupName:Group2'". Thus, in this case, the second constraint could have been removed from constraint set 122. However, in the example of FIG. 1 the optimization has not occurred, and thus both constraints are in constraint set 122.

Assertion(s) 124 is a set of one or more assertions that are derived from abductive answer set 116. Assertion set 118 in abductive answer set 116 contains the assertion "Susan says Bob possess % A". However, this assertion, in the form stated, contains an ungrounded variable, and thus would not be sufficient in its existing form to cause query 106 to be true under policy 108. Thus, the assertion(s) that is/are actually presented to guard 104 may be derived from abductive answer set 116 and/or from the assertions and constraints contained therein. For example, this derivation may comprise replacing variables with constants that satisfy the constraints in constraint set 122. As another example, a "dummy principal" may be used in the query on which abduction is performed, and assertion(s) 124 may be a set of one or more assertions in which "dummy principal" is replaced with the name of an actual principal. This may be done in cases where the final target principal for a given query is not known a priori (e.g. when one wishes to transfer authority to a third party to grant access rights to an unknown fourth party). For example, if one wants to know how to allow some arbitrary principal to read foo.txt, one could provide a read access request indicating the requester is "Dummyprincipal" which would result in the query "Dummyprincipal can read foo.txt" (and, possibly, the assertion "Joe says Dummyprincipal can read foo.txt") being provided to the abduction process, which could then generate an answer set with an assertion such as "Susan says Dummyprincipal possess % A". The actual assertion(s) 124 that are provided to guard 104 could then be derived from this answer set by substituting an actual principal's name in place of "Dummyprincipal."

A further example of how assertion(s) 124 can be derived from abductive answer set 116 is simply to include one or more assertions from assertion set 118 within assertion(s) 124. For example, assertion set 118 might contain an assertion that has no variables, such as "Susan says Bob possess 'groupName:Group1'". In this case, that assertion could be included in assertion(s) 124, and this inclusion is an example of assertion(s) 124 being derived from answer set 116 and/or from assertion set 118.

Assertion(s) 124, based on abductive answer set 118, may be presented to guard 104. Additionally, any supporting assertions that may have been provided in the original abductive query, such as assertion 114, can also be presented to guard 104. When query 106 is presented to guard 104, guard 104 can consider the truth of query 106 in view of policy 108, and in view of assertion(s) 124 and/or assertion 114. Based on policy 108 and the assertion(s), guard 104 determines whether query 106 has, or has not, been demonstrated to be true by the assertions. If query 106 has been demonstrated to be true, then the query succeeds, and guard 104 allows access to resource 102. If query 106 has not been demonstrated to be true, then query 106 fails and guard 104 does not allow access to resource 102. If the original policy has not been modified, the original supporting assertions are supplied, and all assumed assertions are supplied with constraints satisfied, then access would be granted.

Figure 2:
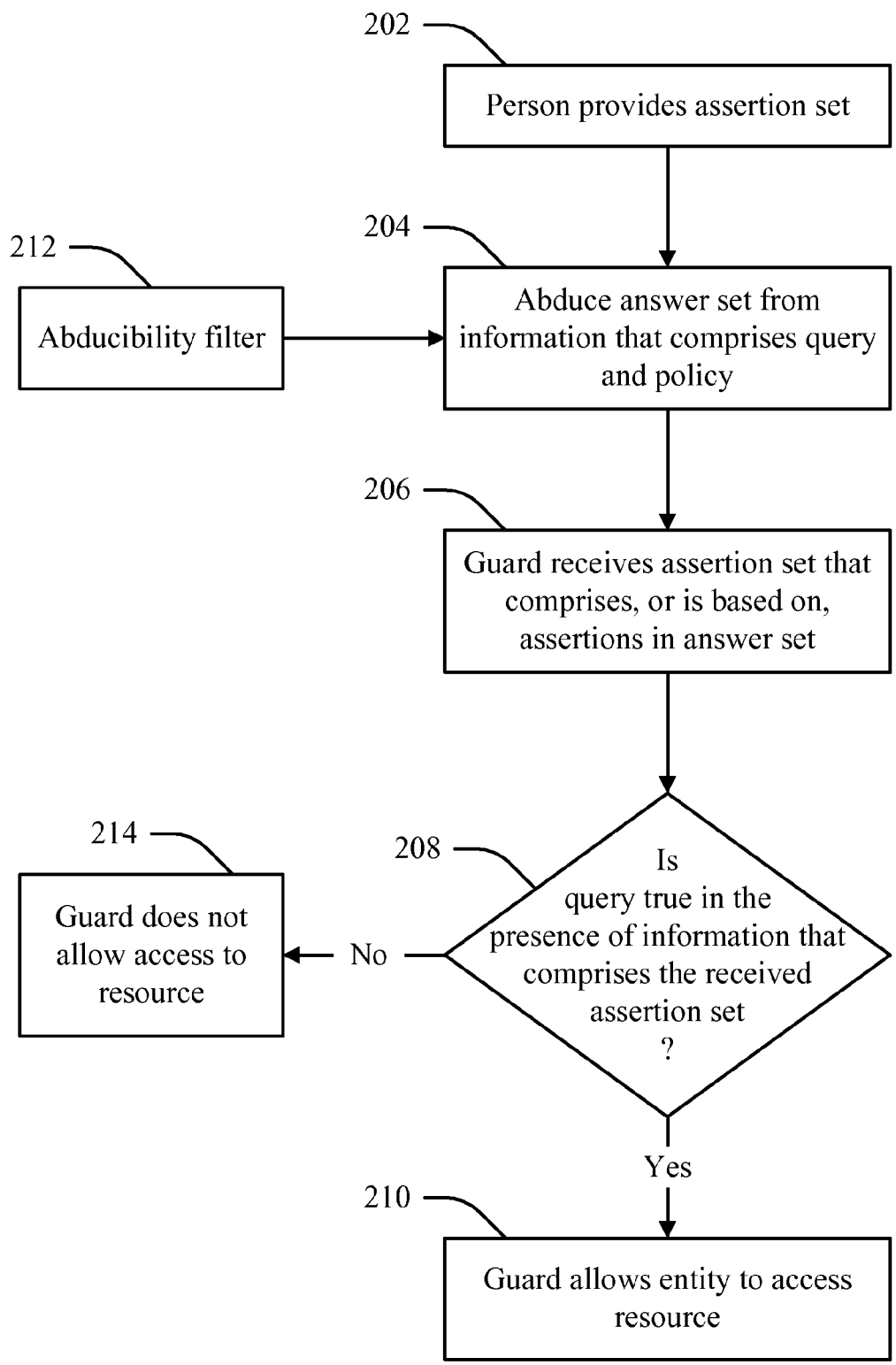
FIG. 2 is a flow diagram of a process in which an answer set for a query is abduced.

FIG. 2 shows a process in which an answer set is abduced for an access query. The process of FIG. 2 (as well as any processes shown in other figures) may be carried out with respect to the systems, scenarios, and components described herein, but could also be carried out using any other mechanisms. Additionally, each of the flow diagrams in FIG. 2 (and in other figures) shows an example in which stages of a process are carried out in a particular order, as indicated by the lines connecting the blocks, but the various stages shown in these diagrams can be performed in any order, or in any combination or sub-combination.

At 202, an assertion set is provided. For example, assertion 114 (shown in FIG. 1) may be provided as input to the abduction process in order to inform the abduction process that the assertion has already been made (or can be made) and thus the abduction process does not need to assume that assertion. Providing, to the abduction process, an assertion that has been made or will be made in an actual access request helps to focus the abduction process on finding answers that use existing assertions, which may reduce the number of assumed assertions that one needs to obtain from the relevant principals. This also reduces the space of possible proofs to be searched and can yield significant reductions in running time. However, in some cases, assertions are not provided at 202, and the abduction process goes forward nonetheless. The entity that provides the assertions at 202 may be a person (as indicated in FIG. 2), or any other type of entity that wants to know how to cause a particular query to be true. This person may provide an assertion that is known to exist (or that the person can arrange to exist), and then may use the abduction process to find out what else is to be asserted in order to cause the query to be true.

At 204, abductive reasoning is used to abduce an answer set from information. The information from which the answer set is abduced comprises the query, the policy, and/or any assertion(s) that were provided at 202. Systems and processes that may be used to abduce an answer set are described subsequently, and any such system could be used at 204.

A system that abduces an answer set may make use of abducibility filter 212 to determine what types of assertions can be abduced. A system that implements abductive reasoning looks for assertions that, if made, would cause the query to be true. However, some statements that would logically prove the query to be true are not the kinds of assertions that one is seeking. For example, the abduction process could avoid including assertions in answer sets that would be difficult to obtain in practice (e.g., if it is unlikely that the principal requesting access to the resource could obtain access rights directly from a trusted authority, then the abduction process could avoid generating a direct assertion of the principal's rights), so that the process can focus on creating answer sets with the right types of assertions. Abducibility filter 212 can implement the criteria that determine when an abduced assertion is not to be included in an answer set. Abducibility filter 212 can be defined by a user, administrator, or other operator based on the relevant facts of the system. For example, an administrator may know that a principal named "David" is not available to make assertions, and may therefore define abducibility filter 212 to exclude assertions made by David, even if such assertions would logically support the truth of the query. Abducibility filter 212 can implement any criteria, and can be defined by any entity in any manner.

At 206, the guard (e.g., guard 104, shown in FIG. 1) receives assertions that comprise, or are based on (or derived from), assertions in the answer set. The assertions received at 206 may not be the exact assertions that appear in the answer set, since there may be variables to be substituted with values, or a dummy principal to be replaced with a real principal. If the answer set contains an assertion with constants and no variables (e.g., "David says Bob can read abc.txt"), then this assertion might be presented to the guard without modification. However, if the assertion set contains a statement with a variable (e.g., "Susan says Bob possess %A"), then the assertion presented to the guard may contain a value in place of the variable %A. (The value to be substituted for %A may be chosen with consideration of constraints specified in the answer set.) Moreover, in some cases the answer set may be provided in terms of a dummy principal, as described above. In such a case, when an actual assertion is presented to the guard in order to allow a real principal to read foo.txt, the name of a real principal is substituted for the name of the dummy principal. Thus, at 206, a set of one or more assertions is presented to the guard, which may or may not be a verbatim copy of an assertion contained in the answer set.

In addition to the assertions in the answer set (or those based on/derived from those in the answer set), the guard may also receive one or more other assertions, such as the assertion(s) that were provided at 202. Moreover, the guard may have access to additional facts, such as the current date and time, which might be relevant in determining whether the query is true.

The guard evaluates information that comprises the assertion set and/or other available facts, and then determines whether the query is true in the presence of this information. If the query is true (as determined at 208), then the guard allows an entity to access the resource to which the query is requested access (at 210). If the query is not true, then the guard does not allow access to this resource (at 214).

Figure 3:
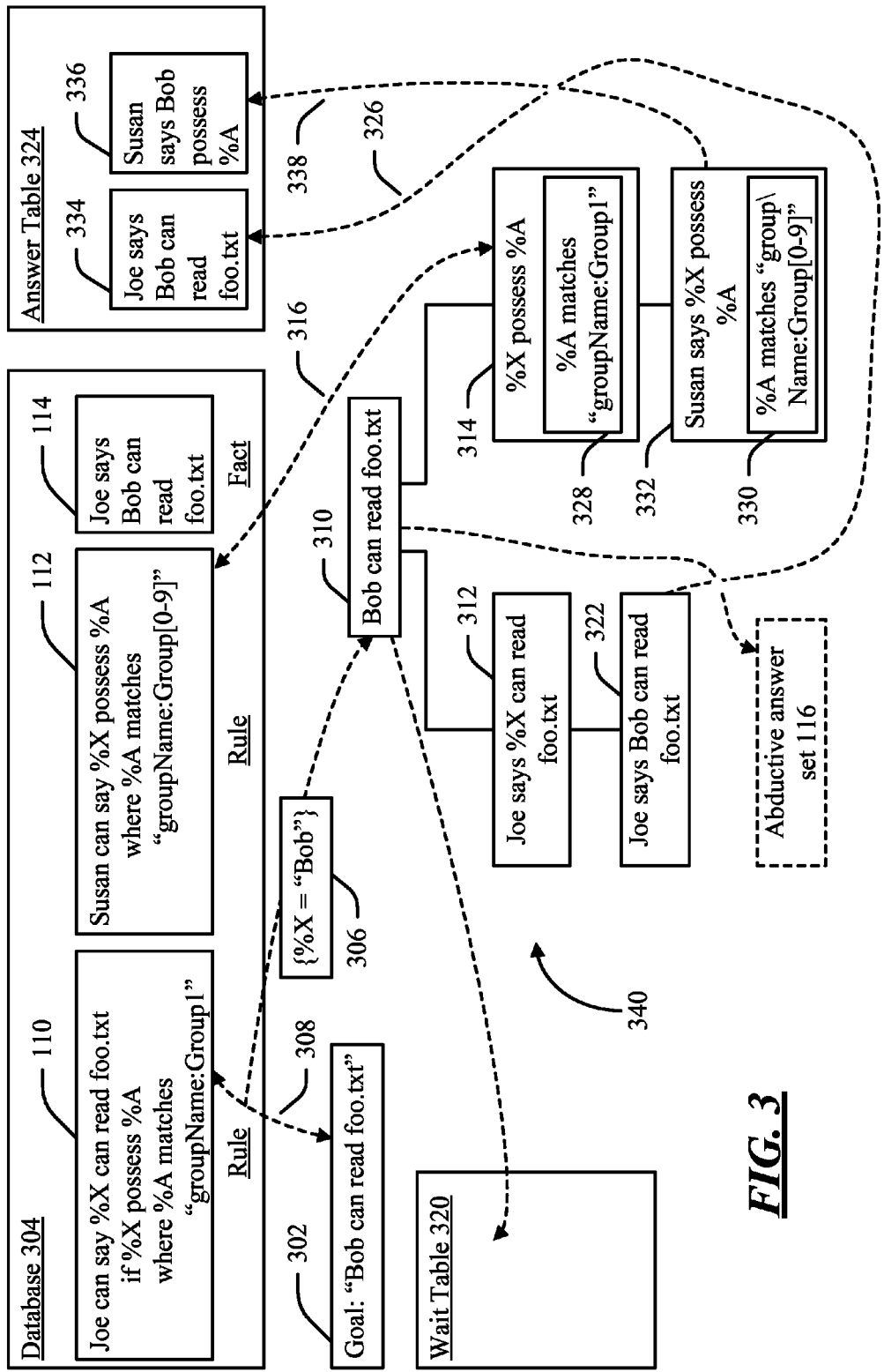
FIG. 3 is a block diagram of a system that may be used to create an abductive answer set.

FIG. 3 shows a system that may be used to create abductive answer set 116. In one example, the system of FIG. 3 is implemented by the guard, in which case the guard may expose query abduction as a service. However, such a system can be implemented in any manner or context. Moreover, FIG. 3 is merely an example of a system that creates abductive answer sets, and such abductive answer sets can be created using any system.

A goal 302, and the known rules and facts, are provided to the system as input, and the system generates, as output, a solution that includes abductive answer set 116. The solution generated by the system may include plural abductive answer sets that answer the same goal 302, although the example of FIG. 3 shows a single abductive answer set. Goal 302 is a statement for which facts are to be abduced that would make the statement true. If the system is being used to abduce facts that would cause a query to be true, then the query statement can be used as the goal. (The query statement itself is one example of a goal to be proved; abduction can be used to derive a proof of any goal, regardless of whether that goal is the access query itself.) In the example of FIG. 3, the system is being used to find assertions that would cause query 106 (shown in FIG. 1) to be true, so goal 302 is set equal to the statement of that query ("Bob can read foo.txt"). The facts and rules that are available to the guard are provided to the system and are stored in database 304. Thus, database 304 contains rule 110, rule 112, and assertion 114, which are labeled "rule" or "fact" accordingly in FIG. 3.

The system attempts to build one or more proof graphs for goal 302. Goal 302 may be a statement that is to be proved true with a set of premises. The proof can be built in a top-down fashion. Thus, goal 302 is the root node 310 in graph 340. (FIG. 3 shows one proof graph 340, although plural proof graphs can be built for the same goal, each representing a different proof of that goal. Different proof graphs, or subgraphs, can be compared with each other to determine if one subsumes the other, as discussed below in connection with FIGS. 4, 5, and 8.) The child nodes 312 and 314 of the root are sub-goals that, if met, would prove goal 302 to be true. Each sub-goal may have one or more sub-goals of its own. Graph 340 continues to grow deeper from the root until answers are achieved. In the abduction process, answers may be known assertions that have already been provided, or abduced assertions. The abduced assertions in a given proof graph form the assertion set that is part of answer set 116 (shown in FIG. 1).

An example process of building proof graphs is as follows. For each item in database 304, an attempt is made to resolve the literal of goal 302 with the rule—that is, to find the set of answers to the goal that are implied by the rule. Part of the process of resolving the goal literal with a rule is to determine whether there is a set of variable bindings (or "binding set") that unifies the goal with the rule. Goal 302 does not have a verb in common with rule 112, so goal 302 and rule 112 do not unify and, therefore, there is no resolution of goal 302 with rule 112. Goal 302 does not unify with assertion 114; they have different literals, and, since assertion 114 has no variables that could be substituted, there is no binding set under which one statement would imply the other. Goal 302 and rule 110 both have the verb "can read": Goal 302 states "Bob can read foo.txt", and rule 110 states "% X can read foo.txt". These statements unify under binding set 306 ({% X="Bob"}). Thus, the resolution of goal 302 and rule 110 (as represented by line 308) produces a node in the proof graph, with goal 302 as the answer represented by that node.

Node 310 has two sub-goals, which are derived from rule 110 and are represented as child nodes 312 and 314. (An initial goal that is based on the statement of a query, such as goal 302, may be referred to herein as a "top-level" goal to distinguish it from sub-goals.) Based on rule 110, it can be seen that Bob will be allowed to read foo.txt if the following conditions are met: (1) Joe says "% X can read foo.txt", and (2) % X possesses % A, where the value of % X is assigned according to binding set 306 (i.e., % X="Bob"). Thus, these two conditions are attached to node 310 as sub-goals of the top-level goal "Bob can read foo.txt". While there are limits as to the values that could be assigned to % A if the assertions are to cause the query to be true, the variable % A is not part of binding set 306. This is because % A is not a parameter of any verb that goal 302 and rule 110 have in common, so % A is not part of unifying rule 110 with goal 302. However, the "where" clause in rule 110 specifies a constraint on the set of value(s) that % A can assume, and this constraint 328 becomes part of node 314. When the proof graph is complete, the accumulated constraints may be provided as part of an answer set, and this constraint set will define what value(s) % A would have to take on in order for assertions involving % A to meet goal 302. (The accumulated constraints may be compacted, and this compaction process is discussed subsequently.)

With sub-goals having been created at nodes 312 and 314, an attempt is now made to resolve the literals of each of these sub-goals with the known facts and rules in the database. Node 310 is placed on wait table 320. Wait table 320 identifies nodes that may continue their derivation processes when new answers matching the nodes sub-goals are found. As the proof graph develops and new answers become available, these nodes can be reconsidered to determine if any of the newly-generated answers satisfy the sub-goals of the node, and as such may lead further new answers.

The literal of the sub-goal at node 312 is "Joe says % X can read foo.txt", and this literal is resolved against the items in database 304 in a process similar to that used to resolve goal 302. When the literal "Joe says % X can read foo.txt" is compared with the items in database 304, and when a substitution of % X is made in accordance with applicable binding set 306, it can be seen that there is a fact in database 304 that satisfies the sub-goal of 312. This fact exists in database 304 as assertion 114. A node 322 containing this fact is attached to node 312 as a child. Since node 322 is a fact—and therefore has no sub-goals—the fact 334 represented by node 322 is added to answer table 324 (as indicated by line 326). Answer table 324 contains facts that are answers to a goal or sub-goal in the proof graph. When the proof graph is complete, answer table 324 contains a set of facts that, collectively, would prove goal 302 under the applicable policy. (In addition to containing known facts from database 304, answer table 324 may also contain abduced facts as discussed below, and may also contain intermediate facts that were discovered in the course of trying to prove the goal—even if such intermediate facts did not lead to a proof.)

Returning now to node 314, an attempt is made to resolve this sub-goal against the items in database 304. The literal of the sub-goal at node 314 is "% X possess % A". That literal contains a verb in common with rule 112 ("possess"), the arities of the verbs match, and there is a unifying binding; thus the literal resolves with rule 112 (as indicated by line 316). Binding set 306 continues to apply down the proof graph, but no additional bindings are created as a result of the resolution, since "% X possess % A" (in the literal of node 314) unifies with "% X possess % A" (in rule 112) without any variable substitutions. Based on the resolution of node 314 with rule 112, "Susan says % X possess % A" is a sub-goal of the literal "% X possess % A". Moreover, rule 112 contains constraint 330 on variable % A. So a new node 332 is created, which specifies the literal sub-goal "Susan says % X possess % A", and contains constraint 330 on the value of variable % A. (The backslash character in constraint 330 indicates that the quoted string is broken across two lines due to space limitations in the drawing; the backslash character is not substantively part of the example constraint.)

The literal of node 330 is not deducible from any item in database 304, so node 330 does not resolve with any of these items. Thus, node 330 represents an un-resolved sub-goal of the proof graph. However, this unresolved sub-goal represents a fact that, if true, would complete the proof of goal 302. In the abductive reasoning process, a fact based on an unresolved sub-goal can be added to answer table 324 as an assumption. Such an assertion is a fact that is assumed for the purpose of the proof, and thus may sometimes be referred to as an assumption. So, substitution in accordance with binding set 306 is made, and the resulting fact 336 is added to answer table 324 (as indicated by line 338). (In the example of FIG. 3, no binding sets other than binding set 306 were created. If unification during the resolution process had resulted in any additional binding sets, then substitutions in accordance with these additional binding set would be made as well when creating fact 336.)

In one example, an abducibility filter (such as abducibility filter 212, shown in FIG. 2) may be applied to an unresolved sub-goal before an assumption based on that sub-goal is added to answer table 324. The filter may be defined to avoid placing assumed facts on the answer table that would result in unusable proofs. For example, suppose that one knows that Susan is not available to make any assertions that she has not already made. Then, answer sets that depend on assertions made by Susan would not help to achieve goal 302. An abducibility filter can be used to prevent abduced assertions that meet (or fail to meet) certain criteria from being placed on the answer table. The abducibility filter thus acts as a gatekeeper to determine what types of un-resolved sub-goals can be assumed as facts through the abductive reasoning process. The abducibility filter can be defined by a user, administrator, or other person with knowledge of the relevant circumstances, but could also be defined in any manner.

Once the answer table contains answers (either actual facts or abduced assertions that constitute assumed facts) from which goal 302 can be met, the proof graph is complete. The abduced assertions are included in answer set 116 (the substance of which is shown in FIG. 1). Also included in answer set 116 are any constraints that have been accumulated in the proof graph, such as constraints 328 and 330.

It is possible that different sets of facts can lead to the same conclusion. Thus, when answer sets are created for goals and sub-goals (e.g., by the process discussed above in connection with FIG. 3), it is possible for two different ways of reaching the same goal or sub-goal to be created. In many cases, there is an arbitrarily large number of different proofs of the same conclusion, so, while these proofs are being created, it is possible to compare new proofs with existing ones to determine whether the new proofs are to be kept after being compared with the existing proofs. For example, a new proof might not represent an improvement over the proofs that have already been found (e.g., the new proof might be a more roundabout way of reaching the same result through a larger number of assertions and/or constraints, or it might contain an answer that is already implied by an existing answer), in which case the new proof might not be used as part of the solution to a goal or sub-goal. The determination of whether a new proof is to be used in view of existing proofs can be made by comparing two answers to determine whether one subsumes the other. Such a subsumption comparison is shown in FIG. 4.

Figure 4:
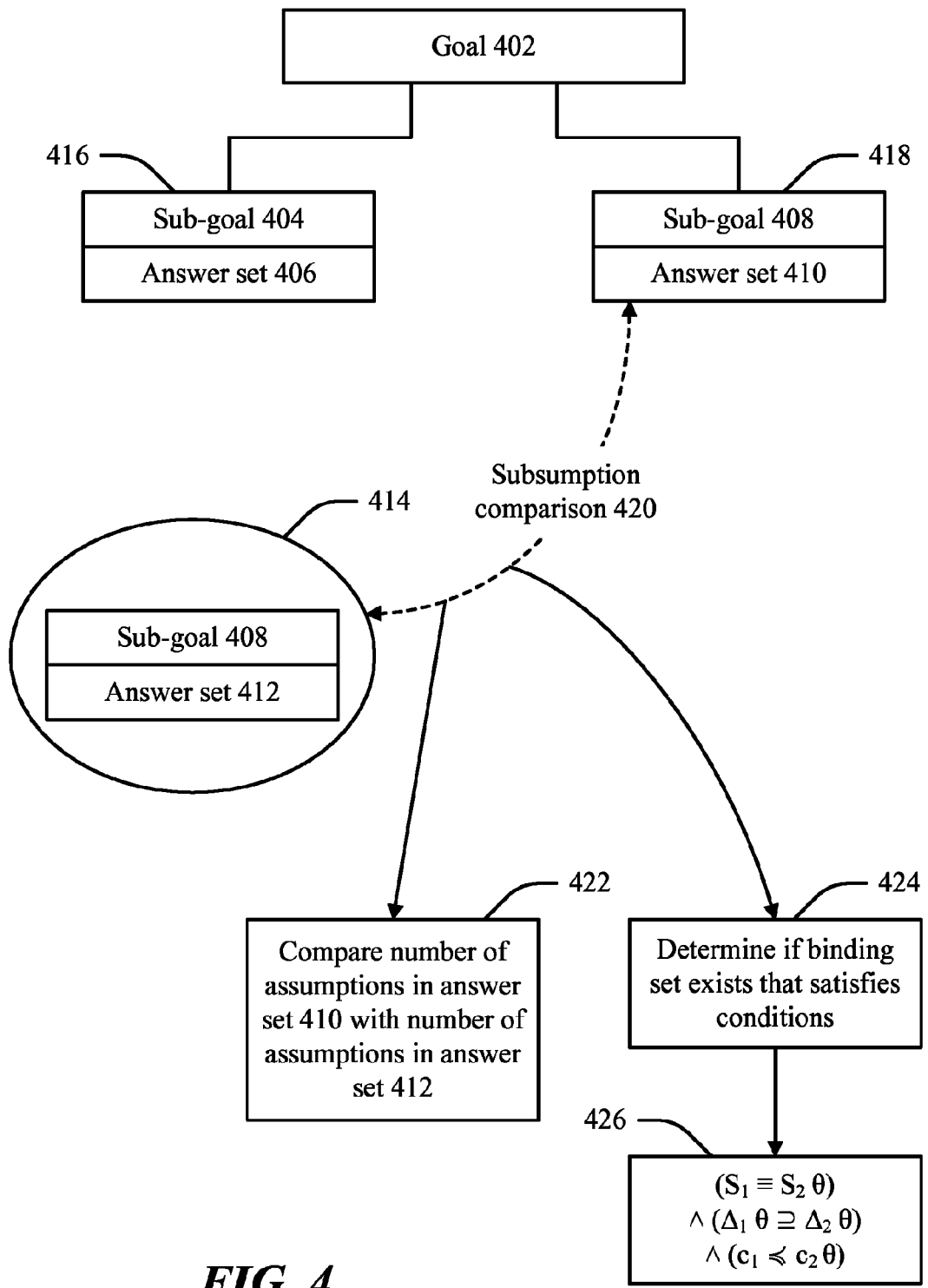
FIG. 4 is a block diagram of a scenario in which two nodes are compared to determine if one subsumes the other.

In the example of FIG. 4, goal 402 has two sub-goals 404 and 408, represented by nodes 416 and 418, respectively. Each sub-goal has a corresponding answer set 406 and 410. In the discussion of FIGS. 1-3, the "answer set" has been used (by way to example) to refer to an answer to a top-level goal, such as the statement of a query. However, sub-goals can also have answer sets. Thus, answer set 406 comprises the set of assumed assertions that, together with known facts (if any), will cause sub-goal 404 to be true under the relevant policy. Likewise, answer set 410 comprises the set of assumed assertions that, together with known facts (if any), will cause sub-goal 408 to be true under the relevant policy.

At some point during the process of generating answer sets, an answer set that meets an existing goal or sub-goal may created. In FIG. 4, node 414 is created, which contains sub-goal 408, which is the same sub-goal 408 as in node 418. However, nodes 418 and 414 uses different answer sets 410 and 412 to reach that same sub-goal. In the example of FIG. 4, nodes 414 and 418 each represent the same sub-goal, but it is also possible to have two nodes that represent the same top-level goal. Top-level goals and sub-goals may be processed in similar ways. Thus, the following discussion of how to determine if one answer set for a sub-goal subsumes another answer set for the same sub-goal could also be applied to a situation in which there are two answer sets for the same top-level goal.

Answer sets 412 and 410 represent different ways of reaching the same sub-goal 408. However, if answer set 412 fails to offer something that is not found in answer set 410, then there may be no reason to use answer set 412 as part of the solution that is eventually provided for goal 402. For example, answer set 412 may contain a superset of the assertions in answer set 410, in which case answer set 412 may be a longer path to reach the same result as answer set 412. A comparison between the two nodes may be made to determine if one node's answer is subsumed by the other.

Subsumption is a relationship that may exist between two nodes. (There are at least three types of subsumption discussed herein: assumption-subsumption, which applies to a comparison of nodes or answer sets, constraint-subsumption, which applies to a comparison of constraint sets, and literal-subsumption, which determines whether a substitution exists that causes two literals to be equivalent. Where applicable these longer terms will be used to distinguish the three types of subsumption.) Subsumption is expressed by the symbol "$\preccurlyeq$", which is read "is subsumed by." The condition of one node being subsumed by another node can be described as follows:

$$n_1 \preccurlyeq n_2 \Leftrightarrow (|\Delta_1| \geq |\Delta_2|) \wedge (\exists \theta [(S_1 \equiv S_2 \theta) \wedge (\Delta_1 \supseteq \Delta_2 \theta) \wedge (c_1 \preccurlyeq c_2 \theta)])$$

In reading this statement, nodes $n_1$ and $n_2$ are each understood to have an answer set that comprises assumptions—or abduced assertions—represented by $\Delta$, an answer literal represented by S, and a set of constraints represented by c. The vertical bars surrounding instances of $\Delta$ represent the cardinality of the set, or the number of abduced assertions in the set. Thus, the mathematical statement above means that $n_1$ is subsumed by $n_2$ if:

the number of abduced assertions in $\Delta_1$ is greater than or equal to the number of assertions in $\Delta_2$; and there exists a substitution $\theta$, such that:

$S_1$ is logically equivalent to $S_2$, when variables in $S_2$ are substituted according to $\theta$;

$\Delta_1$ is a superset of $\Delta_2$, when variables in $\Delta_2$ are substituted according to $\theta$; and $c_1$ is subsumed by $c_2$ (constraint-subsumption), when variables in $c_2$ are substituted according to $\theta$.

Thus, as shown in FIG. 4, a subsumption comparison 420 takes place between two nodes 414 and 418. As part of this subsumption comparison, the number of assumptions in answer set 410 is compared (at 422) with the number of assumptions in answer set 412 ($|\Delta_1| \geq |\Delta_2|$). As another part of subsumption comparison 420, it may be determined (at 424) whether a binding set $\theta$ exists that satisfies certain conditions. One example of a set of conditions that could be satisfied is shown at 426, and these conditions correspond to certain conditions shown in the equation above—i.e., $(S_1 \equiv S_2 \theta) \wedge (\Delta_1 \supseteq \Delta_2 \theta) \wedge (c_1 \preccurlyeq c_2 \theta)$.

If node 414 is subsumed by node 418, then node 414 is not used as an answer to sub-goal 408, since the answer set 412 contained in node 414 may be a more unwieldy and less efficient way than answer set 410 to reach the same sub-goal 408. On the other hand, if node 414 is not subsumed by node 418, then answer set 412 can be used as a possible answer to sub-goal 408. For example, to the extent that the solution (answer set(s)) for top-level goal 402 is based on the answer set(s) of goal 402's sub-goals, top level goal 402 may have two separate answer sets—one that incorporates answer set 412, and another that incorporates answer set 410. As another possibility, the answer set(s) to goal 402 could include answer set 412 without including answer set 410.

Regarding the constraint-subsumption condition represented by the expression ($c_1 \preccurlyeq c_2 \theta$), each type of constraint may have its own condition for constraint subsumption. The condition may be based on whether, for two constraints with ungrounded variables, satisfaction of one constraint implies satisfaction of the other. Formally, $c_1 \preccurlyeq c_2 \theta$ if, for all $\theta$ that ground both $c_1$ and $c_2$, $c_1 \theta$ is valid implies that $c_2 \theta$ is valid. This subsumption relationship can be evaluated with a theorem prover, but the following are some example heuristics that can be used to determine whether the statement "A is subsumed by B" is true for various pairs of constraints A and B:

If the types of two constraints do not match, then the statement is false;

Otherwise, if the types of the two constraints, and all of their parameters, are identical, then the statement is true;

Otherwise, if A and B are constraints of the same type (e.g., both "LessThanOrEqual" constraints, or both "NotEquals" constraints, etc.) then:

LessThanOrEqual(x,y): The statement is true if B.y≤A.y;

NotEquals(x,y): The statement is false (unless the parameters for both constrains are identical—in which case the statement would have been found true by one of the conditions above)

DurationConstraint(x,y,c): true, if A.x=B.x, A.y=B.y, and A.c≥B.c;

Match(x,c): true, if match-type is equal and A.c=".*";

PrimaryPrincipal(x): false;

TemporalConstraint(x,y): true, if B.x≥A.x and B.y≤A.y;

LocationConstraint(x): true, if A.x=".*".

The foregoing are examples of ways to evaluate whether one constraint subsumes another. Other ways of determining whether one constraint subsumes another may be used. Moreover, constraints having types other than those shown above may be used.

Figure 5:
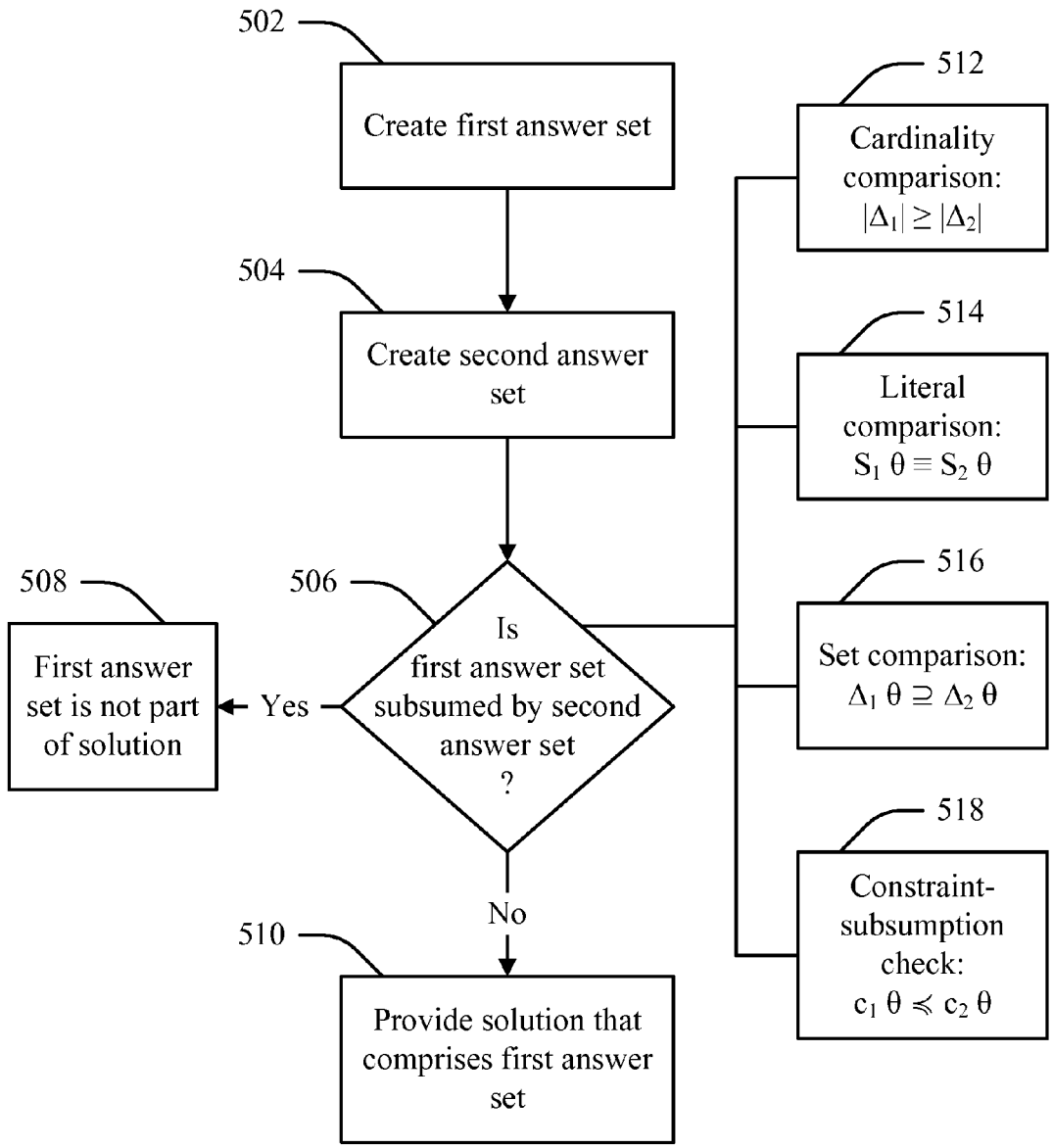
FIG. 5 is a flow diagram of a process of determining whether a first answer is subsumed by a second answer.

FIG. 5 shows a process in which a subsumption check is performed on two answer sets. At 502, a first answer set is created. At 504, a second answer set is created. The first and second answer sets may be answers to a top-level goal, or they may be answers to sub-goals.

At 506, a determination is made as to whether the first answer set is subsumed by the second answer set. This determination may be made using criteria such as: a cardinality comparison as to the number of assumptions in each answer set (512); a comparison of the answer literals in each answer set when a binding set, theta, is applied (514); a comparison of the assumption sets in each answer set to determine if the first answer set's assumption set is a superset of (or the same set as) the second when a binding set, theta, is applied (516); and/or a constraint-subsumption check to determine if the constraint set in the first answer set is subsumed by the constraint set in the second answer set when a binding set, theta, is applied (518). One or more of these example criteria, or other criteria, may be used in making the subsumption assessment.

If an answer can be found to a goal or sub-goal, then a solution is created based on one or more of the answers. Whether a solution includes or is based on a particular generated answer set may depend on whether one answer set is subsumed by an existing answer set. In this regard, if the first answer set is subsumed by the second answer set, then the first answer set is discarded (at 508). On the other hand, if the first answer set is not subsumed by the second answer set, then the solution may comprise, or be based on, the first answer set (at 510).

Figure 6:
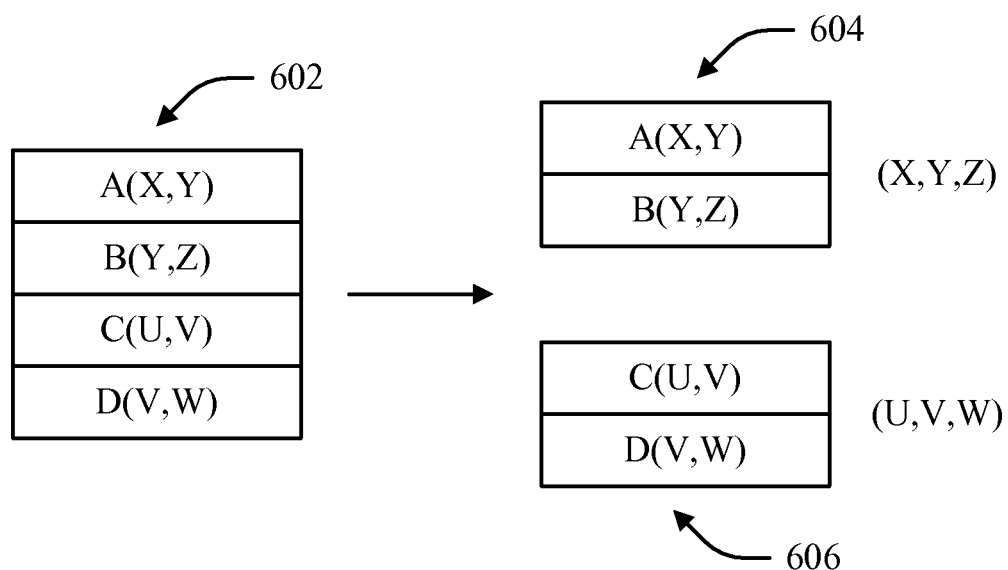
FIG. 6 is a block diagram of a set of assertions that is split into clusters.

As can be seen from the preceding discussion, parts of the subsumption check may involve considering the abduced assertions in view of a set of variable bindings. This aspect of the subsumption check can be implemented efficiently by splitting the assertions into clusters, and evaluating the clusters separately. Clusters are groups of assertions whose variables do not intersect, as shown in FIG. 6.

Set 602 has four assertions: A(X,Y), B(Y,Z), C(U,V), and D(V,W). In this set of assertions, A, B, C, and D are the predicates (verbs), and X, Y, Z, U, V, and W are the variables.

As can be seen, the first two assertions in set 602 (A and B) have variable Y in common with each other, and the second two assertions (C and D) have variable V in common with each other. However, the first two assertions have no variables in common with the second two assertions. Thus, set 602 can be split into clusters 604 and 606. Cluster 604 includes those assertions that involve variables X, Y, and/or Z, and cluster 606 includes those assertions that involve variables U, V, and/or W. In some cases, commonalities of variables across different assertions prevent a set of assertions from being split into clusters. However, if the use of variables in the assertions permits splitting the assertion set into clusters, then efficiency can be achieved by considering the assertion set cluster by cluster.

Figure 7:
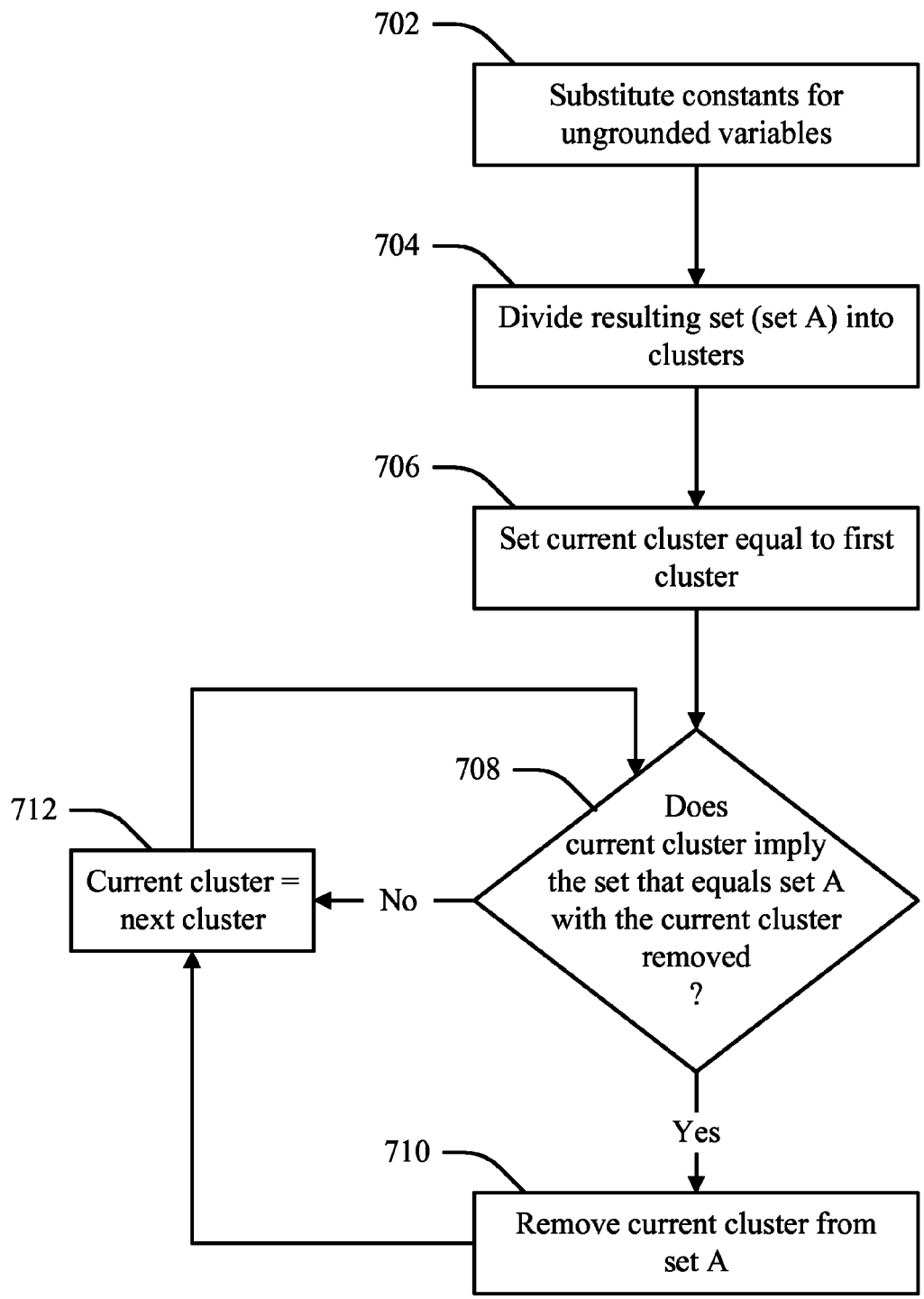
FIG. 7 is a flow diagram of a compaction process.

Additionally, compaction on an assertion set can be performed in order to achieve efficiency and/or to generate an answer set that is more succinct than that which would otherwise be generated. A compaction process compacts an assertion set into a smaller set that is logically equivalent to the original assertion set. FIG. 7 shows an example process of compacting an assertion set.

In order to deal with variables in the assertion set, the variables in the assertions are replaced with constants (at 702). Each variable is assigned a different constant, and these constants are substituted in place of the variables. For brevity, the set that results from replacing variables with constants will be referred, both herein and in FIG. 7, as "Set A". A mapping between the variable names and the constants can be stored, so that this mapping can later be used in a revert substitution to change the constants back to their variable names.

At 704, set A is divided into clusters. The process then proceeds cluster by cluster, so the current cluster (the cluster that is currently being considered) is set equal to a first cluster (at 706).

At 708, it is determined whether the current cluster implies the set that equals set A with the current cluster removed. That is, the current cluster is compared to a set that equals set A minus the elements in the current cluster. If the current cluster implies set A with the current cluster removed, then the current cluster is considered superfluous and is removed from set A (at 710). The current cluster is then set equal to a next cluster (at 712), and the process repeats until all of the clusters have been considered.

After this process completes, the constants in the resulting set can be replaced with their original variables.

Compaction can also be performed on constraints. In constraint compaction, the constraint set is reduced by removing constraints that are subsumed by (constraint-subsumption) other constraints in the set. Thus, a constraint whose satisfaction is implied by other constraints can be removed. Thus, in the preceding examples in which the variable %A was subject to the two constraints of "matches 'groupName:Group1'" and "matches 'groupName:Group[0-9]'", the latter of these two constraints could be removed by a constraint compaction process as having been subsumed by the former: any string that matches "groupName:Group1" would also match the regular expression "groupName:Group[0-9]".

Figure 8:
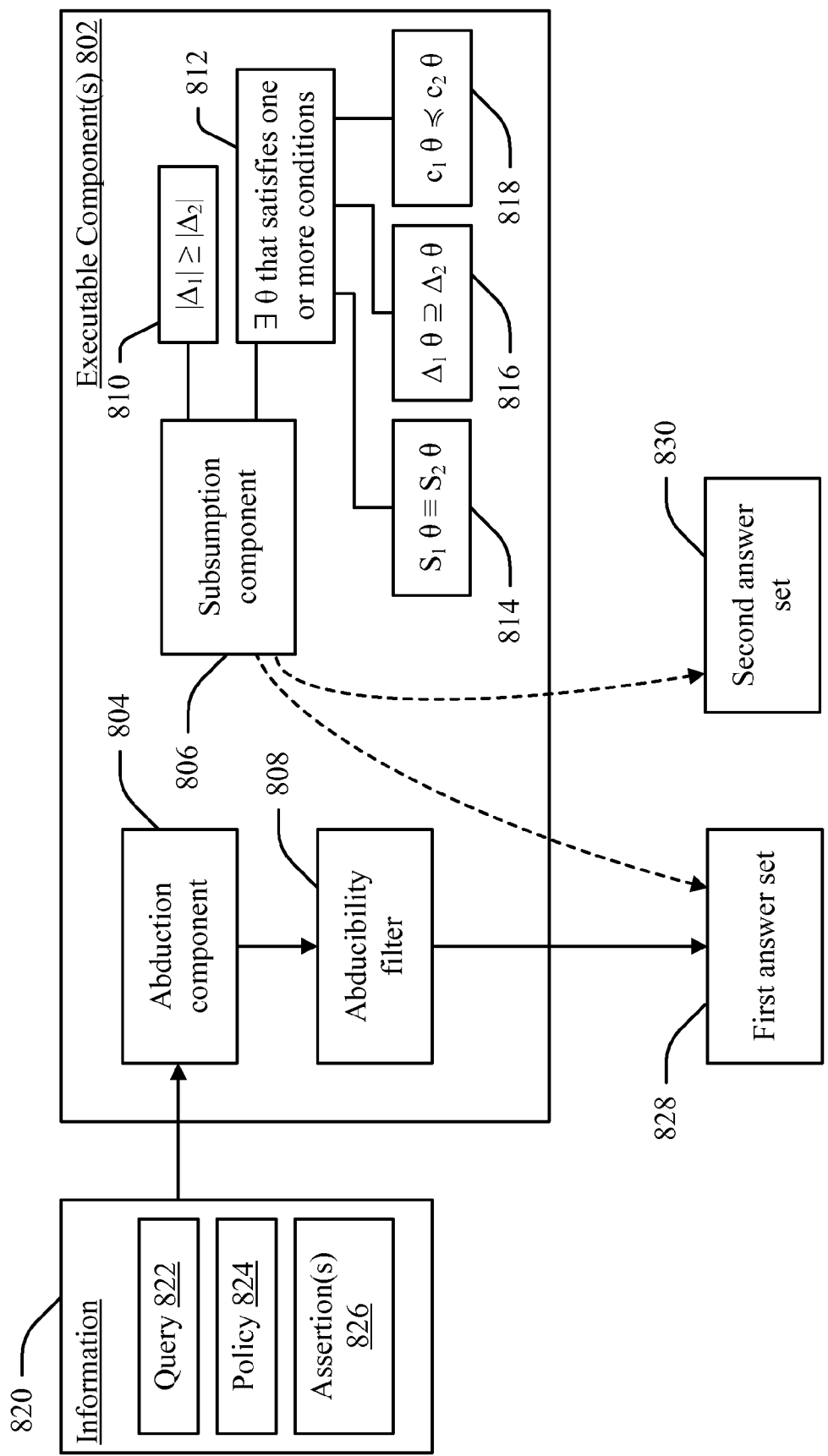
FIG. 8 is a block diagram of a system having various executable components.

FIG. 8 shows an example system of executable component(s) 802 that implement various mechanisms described herein.

Executable component(s) 802 may include an abduction component 804, a subsumption component 806, an abducibility filter 808, and/or various components 810, 812, 814, 816, and 818 that implement aspects of subsumption component 806.

Abduction component 804 receives information 820. Information 820 may comprise query 822, policy 824, and/or assertion(s) 826. Abduction component 804 may abduce one or more answer sets for query 822 based on information 820. For example, abduction component 804 may comprise and/or implement a system, such as that shown in FIG. 3. The assertions abduced by abduction component 804 may be subject to filtering by abducibility filter 808. Abducibility filter 808 is shown as a separate component from abduction component 806, but, alternatively, could be part of abduction component 806. Abduction component generates assertions that, if made, would support the truth of query 822, and abducibility filter 808 may determine whether some or all (or none) of those assertions are to be avoided in answer sets. This determination may be based on whether the assertions meet (or fail to meet) certain criteria. In the example of FIG. 8, abduction component 804 generates a first answer set 828. Second answer set 830 might also have been generated by abduction component 804 (but may be generated by some other mechanism).

Answer sets 828 and 830 may be answers to a top-level goal, such as a statement of query 822. As another example, answer sets 828 and 830 may be answers to a sub-goal that supports a top-level goal. Regardless of what type of goal (or sub-goal) answer sets 828 and 830 are answers to, subsumption component 806 may be used to compare answer sets 828 and 830 to determine if one of the answer sets subsumes the other. In the example of FIG. 8, subsumption component 806 determines whether first answer set 828 is subsumed by second answer set 830.

Subsumption component makes this determination based on various criteria. Components that implement some example criteria are shown in FIG. 8, and these components (and the criteria they implement) may be used in combinations or sub-combinations.

Component 810 performs a cardinality check by determining whether the cardinality of the assumption set ($\Delta_1$) in first answer set 828 is greater than or equal to the cardinality of the assumption set ($\Delta_2$) in second answer set 830. Component 812 determines whether there is a binding set, $\theta$, that satisfies one or more conditions. Components 814, 816, and 818 implement some example conditions that $\theta$ might satisfy. Component 814 determines whether an answer literal, $S_1$, of first answer set 828 is logically equivalent to an answer literal, $S_2$, of second answer set 830, when variables in these literals are substituted according to binding set $\theta$. Component 816 determines whether the assumption set $\Delta_1$ of first answer set 828 is a superset of (or the same set as) the assumption set $\Delta_2$ of second answer set 830, when variables in $\Delta_2$ are substituted according to binding set $\theta$. Component 818 performs constraint subsumption, and determines whether the constraint set, $c_1$, of first answer set 828 is subsumed by the constraint set, $c_2$, of second answer set 830, when variables in $c_2$ are substituted according to binding set $\theta$. The conditions implemented by components 814, 816, and 818 are examples of conditions that binding set $\theta$ might satisfy. These conditions, and/or other conditions, may be used in combinations and sub-combinations.

When plural answer sets are created, a decision may be made as to which answer set(s) to present, and in what order. In some scenarios, answer sets that contain fewer assumptions may be preferred over those that contain more assumptions. One way to choose answer sets with fewer assumptions is as follows. A value may be stored that represents the number of allowed assumptions, and another value stored (initially zero) that represent the number of assumptions currently under consideration. As answer sets are generated, they may be either processed if their assumption set cardinality is equal to or less than the current number of assumptions under consideration, or placed in a queue, ordered by the cardinalities of their assumption sets if their assumption set is of greater cardinality. After all answer sets have been generated using this method, the first answer in the queue is then dequeued, and the current assumption set cardinality value may then be set to the cardinality of the assumption set in the dequeued answer. If the new cardinality is still less than the value of the maximum number of allowed assumption then processing continues in this manner with new answers being processed or added to the queue as above. And so on, until no answers remain in the queue whose assumption set cardinality is less than or equal to the maximum number of allowed assumptions.

The techniques and mechanisms described above may be used to abduce the assertions that would cause a query to evaluate to true. These techniques and mechanisms may be used in any manner and in any context. However, one type of scenario in which abduction of assertions may be used is as part of a process to allow the automated generation of usable delegation assertions. Such a process uses the abduced answer sets to find and/or generate tokens containing assertions satisfying at least one answer set.

Figure 9:
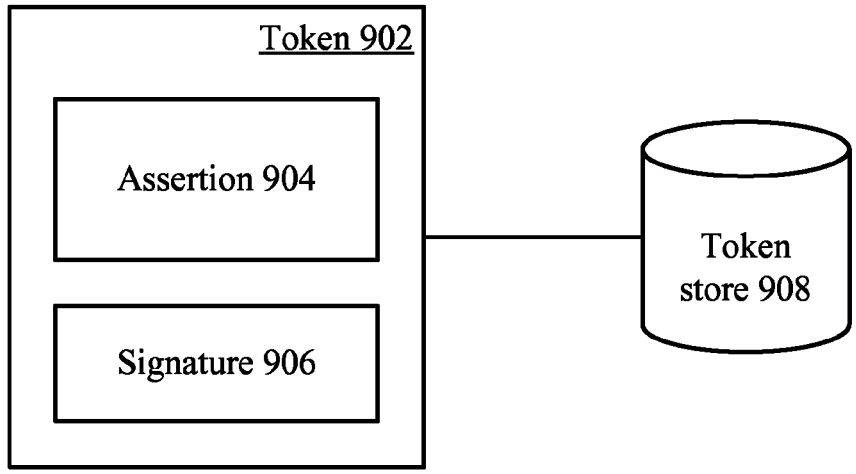
FIG. 9 is a block diagram of an example token.

A token is a way of storing an assertion whose origin and integrity can be authenticated by a receiving party. FIG. 9 shows an example token. Token 902 may contain assertion 904 and signature 906. Assertion 904 may be any type of assertion. Statements previously mentioned, such as "Joe says Bob can read foo.txt" or "Susan says Bob possess 'groupName:Group1'" are examples of assertion 904. Signature 906 may be a digital signature or other mechanism that establishes that the token is an authentic assertion by the asserter named in the token. Thus, if token 902 contains the assertion "Joe says Bob read foo.txt," then signature 906 may be Joe's signature. If Joe maintains a public/private key pair, then signature 906 may be generated by signing assertion 904 with Joe's private key, although signature 906 may be generated in any manner. A token can have any number of assertions. Moreover, a token can contain assertions made by different asserters. Token 902 may be stored in token store 908, which may be a database or other storage facility.

Figure 10:
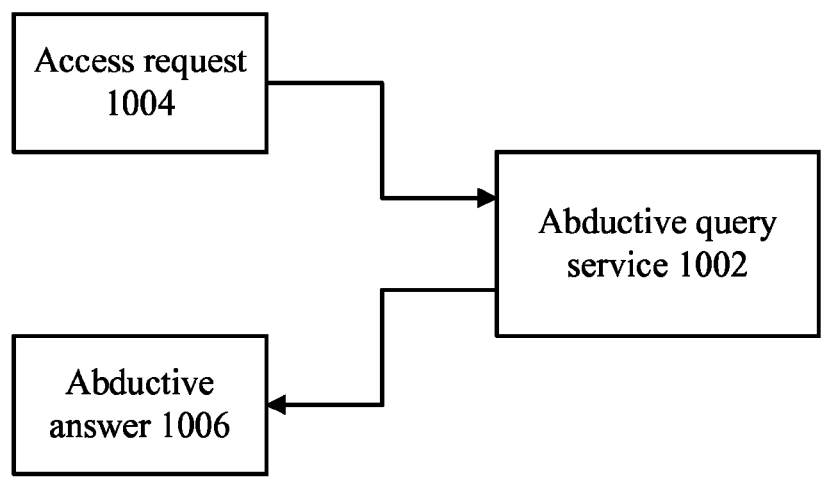
FIG. 10 is a block diagram of an abductive query service.

FIG. 10 shows an example abductive query service 1002. Abductive query service 1002 may contain a mechanism to receive an access request 1004. Abductive query service may generate a query based on access request 1004, and may produce an abductive answer 1006 based on that query. Abductive query service 1002 may also receive, as input, assertion set and/or a set of environmental conditions (e.g., the time). Abductive query service 1002 may be implemented and exposed by a resource guard (e.g., guard 104, shown in FIG. 1 and other figures), or by a proxy for the resource guard that validates potential requests against the policy that governs the resource, although abductive query service 1002 can be implemented by any kind of component that operates in any context. Abductive query service may make use of various data structures to receive the access request and to provide an answer. For example, access request 1004 and answer 1006 may exist in the form of structured data that follows a particular schema. Thus, Table 1 shows an example schema for a desired access request (e.g., access request 1004) and Table 2 shows an example schema for an abductive query response (e.g., answer 1006). The schema of Table 2 refers to an "AssertionTemplateSet" schema, an example of which is shown in Table 3.

TABLE 1

DesiredAccessRequest schema

```
<xsd:element name="DesiredAccessRequest" type="sp:expression" />
  <xsd:complexType name="expression">
    <xsd:sequence>
      <xsd:element name="desiredAccess" type="sp:expression" />
      <xsd:element ref="sp:token" minOccurs="0" maxOccurs=
      "unbounded" />
      <xsd:element ref="sp:environmentVariable" minOccurs="0"
      maxOccurs="unbounded" />
    </xsd:sequence>
  </xsd:complexType>
```

TABLE 2

AbductiveQueryResponse schema

```
<xsd:element name="AbductiveQueryResponse"
type="spwss:AbductiveQueryResponseType" />
<xsd:complexType name="AbductiveQueryResponseType">
  <xsd:sequence>
    <xsd:element ref="spwss:AssertionTemplateSet" minOccurs="0"
    maxOccurs="unbounded" />
    <xsd:element ref="sp:environmentVariable" minOccurs="0"
    maxOccurs="unbounded" />
  </xsd:sequence>
</xsd:complexType>
```

TABLE 3

AssertionTemplateSet schema

```
<xsd:element name="AssertionTemplateSet"
type="spwss:AssertionTemplateSetType" />
<xsd:complexType name="AssertionTemplateSetType">
  <xsd:sequence>
    <xsd:choice minOccurs="0" maxOccurs="unbounded">
      <xsd:element ref="sp:dateTimeVariable" />
      <xsd:element ref="sp:locationPatternVariable" />
      <xsd:element ref="sp:durationVariable" />
      <xsd:element ref="sp:attributeVariable" />
      <xsd:element ref="sp:resourceVariable" />
      <xsd:element ref="sp:principalVariable" />
      <xsd:element ref="sp:actionVerbVariable" />
    </xsd:choice>
    <xsd:element ref="sp:assertion" minOccurs="0"
    maxOccurs="unbounded" />
    <xsd:element ref="sp:constraint" minOccurs="0"
    maxOccurs="unbounded" />
    <xsd:element ref="sp:token" minOccurs="0"
    maxOccurs="unbounded" />
  </xsd:sequence>
</xsd:complexType>
```

These schemas may be used to define the structure of data that contains an access request to be submitted to abductive query service 1002 (Table 1), a response from abductive query service 1002 (Table 2), or the assertion template set(s) that are part of the response from abductive query service 1002 (Table 3).

When an answer is received from abductive query service 1002, it may contain one or more templates. Each template specifies a set of one or more assertions such that the query would be satisfied if the assertions in the set were made. The template also specifies any constraints on variables within the assertions. The template is "instantiated" by attempting to find or generate the tokens that meet the conditions called for in the template. For example, in accordance with the examples set forth in FIG. 1 above, a template for proving the statement "Bob read foo.txt" might contain the following information:

```
Assertions = {
  Joe says Bob read foo.txt;
  Susan says Bob possess %A
}
Variables = { %A }
Constraints = { %A matches "groupName:Group1"}
```

As can be seen, this template contains the information from abductive answer set 116 (shown in FIG. 1). The information could be put into a particular data format (such as an XML format defined by one or more of the schemas above). However, regardless of the data format used, the template may specify the assertions that, if made, would satisfy the query. If the assertions specified by the template involve variables, then the template may further specify any constraints on those variables. The instantiation process then finds or generates tokens that conform to the assertions and constraints specified in the template. In one example, the instantiation process may pass the template from principal to principal in order to obtain the assertions from the relevant principals indicated in the template.

Figure 11:
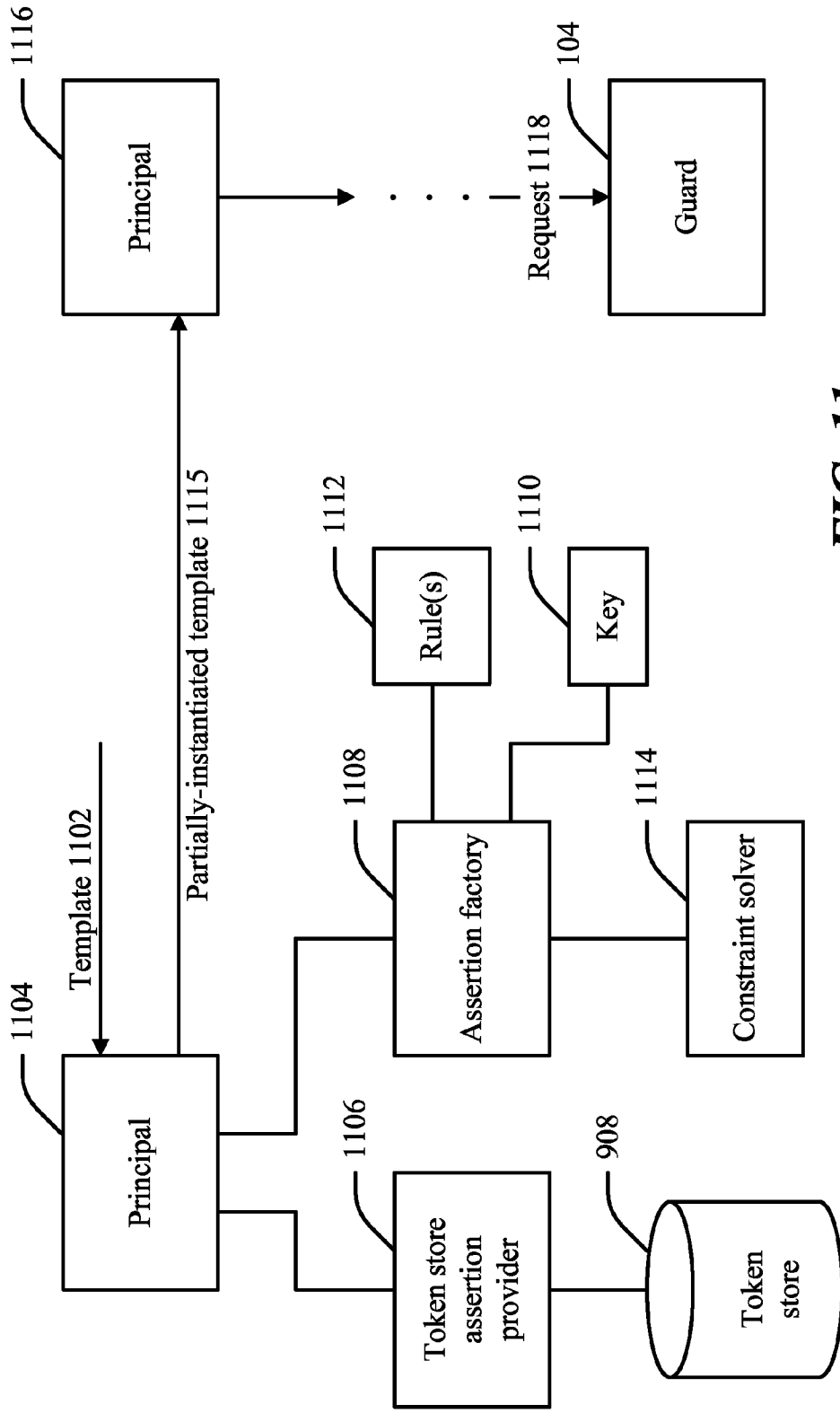
FIG. 11 is a block diagram of an example environment in which instantiation may occur.

FIG. 11 shows an example environment in which instantiation may occur. Template 1102 is provided to principal 1104. Principal 1104 attempts to instantiate template 1102 by obtaining the assertions called for in template 1102. To say that principal 1104 attempts to instantiate a template does not necessarily mean that principal 1104 is a person who is acting in a hands-on manner to instantiate the template. In one example, a principal could be a person, and that person may be asked to make particular assertions. However, in many cases, a principal is a process that is dissociated from any particular person. For example, a principal could be a scheduler or a daemon, and these principals can instantiate a template through software that acts for the principal. Even if the principal is a person, that person can instantiate a template through software that has been set in motion and operates with any degree of control (or none at all) from the person.

Assuming that principal 1104 attempts to instantiate the template (by whatever mechanism, and through whatever agency, that attempt occurs), that attempt at instantiation involves searching for one or more existing token(s) that represent assertions to be made by that principal, attempting to generate such tokens, and/or requesting such tokens from a known authority. The search for existing tokens is performed by token store assertion provider 1106. The attempt to generate new tokens is performed by assertion factory 1108. Token store assertion provider 1106 and assertion factory 1108 may each be implemented as software, executable components, etc.

Token store assertion provider 1106 attempts to find, in a token store, one or more tokens that satisfy template 1102. Token store assertion provider 1106 may attempt to find these tokens in token store 908 (which is also shown in FIG. 9). Token store assertion provider 1106 may examine template 1102 and attempt to find tokens that contain assertions that conform to the assertions in template 1102 and that satisfy any constraints given in template 1102. Thus, if template 1102 contains the assertion "Joe says Bob read foo.txt," and if that assertion is found in token store 908, then token store assertion provider 1106 may retrieve that assertion from token store 908 and report that one of the assertions in template 1102 has been found. A token store may be local or global. In the global case, a single entity with sufficient access could fill out the whole template. But since partial instantiations are possible, a template can be satisfied by local token stores in a distributed process.

Assertion factory 1108 attempts to generate tokens that satisfy template 1102. As noted above, a token may contain an assertion signed with the key of the asserter. Assertion factory 1108 may be in possession of principal 1104's key 1110, and may be able to make and sign assertions on behalf of that principal. Principal 1104 may specify rules 1112 regarding the types of assertions that principal 1104 is willing to have signed with key 1110, so that assertion factory 1108 can generate certain types of assertions on behalf of principal 1104 but not others. For example, if principal 1104 is "Joe", and template 1102 contains the assertion "Joe says Bob read foo.txt" but that assertion has not been found in token store 908, then assertion factory 1108 may generate that assertion and sign it with Joe's key 1110. Before generate and/or signing a token containing this assertion, assertion factory 1108 may consult rules 1112 to determine whether this assertion can be made by Joe or on Joe's behalf. For example rules 1112 might state that Joe will not assert that Bob can read foo.txt (e.g., if Joe believes Bob to be untrustworthy, or if Joe wishes to deny access to Bob for any other reason), in which case this assertion would not be made. (Rules 1112 could define what assertions principal 1104 will make, or could define what assertions principal 1104 will not make, or some combination of these.) If an assertion called for by template 1102 can be made, then the assertion is included in a token and signed by the appropriate principal.

Constraint solver 1114 is used by assertion factory 1108 to determine what values to use for variables in template 1102, based on constraints in that template. For example, if an assertion in template 1102 contains a variable named %X that is subject to the constraint that it match the regular expression "ABC[0-9]" then assertion factory 1108 uses constraint solver 1114 to assign %X a value that satisfies this constraint. While there may be a range of values that would satisfy the constraint (which could either be a set of discrete values, or a continuous range of values), constraint solver 1114 may be configured to choose certain values that fall within that range over other values within the range, based on some principle. For example, an assertion could specify a duration (e.g., a duration for which the assertion is valid) in terms of a starting time (T1) and an ending time (T2). The constraints on these variables could specify that the current time is to fall between the starting and ending times (T1<=currenttime<=T2), and that the total duration is not more than one hour (T2−T1<=1 hour). In this case, setting T1 equal to the current time and T2 one minute ahead of the current time would satisfy the constraint, but would generate an assertion that has a short validity period and may expire before it can be used. Thus, constraint solver 1114 may be configured to choose a longer duration of time. For example, when a duration constraint is to be satisfied, constraint solver 1114 could be configured to follow a rule such as choosing the longest duration that satisfies the constraint. Constraint solver 1114 could observe any variety of different rules to address a variety of different kinds of constraints.

After token store assertion provider 1106 and assertion factory 1108 have been used to find and/or generate assertions of principal 1104, template 1102 may be either fully or partially instantiated. Template 1102 is fully instantiated if tokens have been found and/or generated to satisfy all of the assertions in template 1102. On the other hand, if less than all of the assertions called for by template 1102 have been found, then template 1102 is partially instantiated. This partially-instantiated template 1115 (along with accumulated tokens and any environmental values) may be passed to another principal 1116 to determine if tokens that satisfy some or all of the unsatisfied assertions in template 1102 are available and/or can be generated. Token store assertion provider 1106 and/or assertion factory 1108 may be used to determine if assertions from principal 1116 exist and/or can be generated. This use of token store assertion provider 1106 and/or assertion factory 1108 may proceed in a manner similar to that described above for principal 1104. For example, with respect to the example template described above, principal 1104 may be Joe and principal 1116 may be Susan. Bob may partially instantiate the template by providing the assertion "Joe says Bob read foo.txt," whereupon the template is passed to Susan, who may further instantiate the template by providing the assertion "Susan says Bob possess "groupName:Group1". If all of the assertions in the template have been satisfied, then the template is fully instantiated after Joe and Susan have provided their respective assertions. Otherwise, the template may be passed to additional principals (as indicated by the ellipsis in FIG. 11) to determine if such principals can provide tokens to satisfy the assertions in the template. (If a DummyPrincipal is used, then at some point the dummy principal is replaced with the real target principal. It might be the case that the first client does not know the identity of the target so this substitution may be performed by the first entity that has such knowledge.)

Once any single template in a template set is fully instantiated, the requesting principal(s) know they have the token(s) that will enable a request for the desired access. They can now form an access request 1118 for presentation to the resource guard 104 and include the token(s) that support access request 1118. For example, request 1118 may be a request to read foo.txt sent by the principal Bob, and thus may contain the statement that support's Bob's access ("Joe says Bob read foo.txt"). Request 1118 may also contain or reference the tokens that support the truth of that query—i.e., the tokens that were obtained and/or generated by token store assertion provider 1106 and/or assertion factory 1108. If the tokens support the truth of the statement in request 1118, then guard 104 finds that request 1118 is true and allows Bob access to read foo.txt. Otherwise, guard 104 finds that the statement in request 1118 is false (or has not been established to be true), and denies Bob read access.

Figure 12:
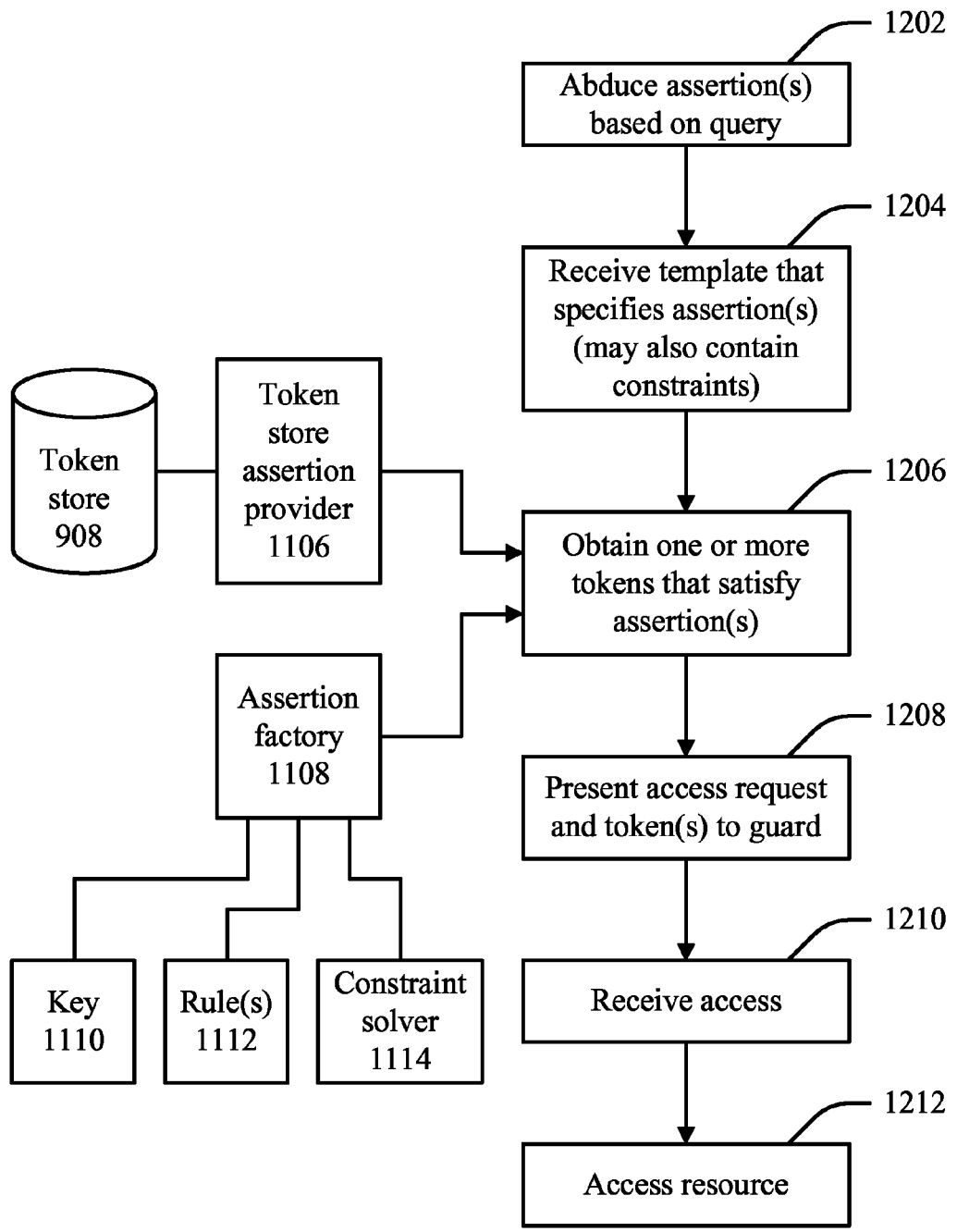
FIG. 12 is a flow diagram of an example process in which a template may be generated and used.

FIG. 12 shows an example process in which a template may be generated and used. In this example process, a template is used to obtain tokens and to satisfy an access query.

At 1202, a set of one or more assertions is abduced based on a query. Abduction of these assertions may be performed using the abductive reasoning process and mechanisms previously described, or by using any other mechanisms. While FIG. 12 shows an example in which the assertions are abduced from a query, a set of assertions can also be created in any manner. For example, any type of computer-driven process could be used to create the assertions, or an administrator with knowledge of an access policy could create a set of assertions by hand. Regardless of the manner in which the assertions are created, the assertions may be included in a template.

At 1204, a template that specifies assertions (e.g., the assertions that were created at 1202) is received. For example, the template may be received by a principal who may be able to make the assertion specified by the template. In addition to assertions, the template may also specify constraints on variables that are included within the assertions.

At 1206 one or more tokens are obtained that satisfy the assertions in the template (and constraints, if applicable). As previously discussed, these tokens may be obtained, for example, by retrieving them from a token store, by generating them with an assertion factory, and/or by requesting them from an authority. Thus, 1206 may be performed by consulting token store assertion provider 1106 and/or assertion factory 1108 (which are also shown in FIG. 11). As noted above in connection with FIG. 11, token store assertion provider 1106 may retrieve tokens from token store 908 (also shown in FIGS. 9 and 11), and assertion factory 1108 may use key 1110, rules 1112, and constraint solver 1114 (also shown in FIG. 11) in the manner(s) previously described.

Once tokens have been obtained to satisfy the assertions in the template (and constraints, if applicable), at 1208 the access request and the tokens are presented to a guard that controls the resource to be accessed. The guard forms a query to reflect the desired access and if it determines that the query has been satisfied (with reference to the tokens presented, and any other facts or information that the guard uses to make the access decision), an indication of access is received from the guard (at 1210). Once an indication of access has been received, the resource may be accessed (at 1212).

Figure 13:
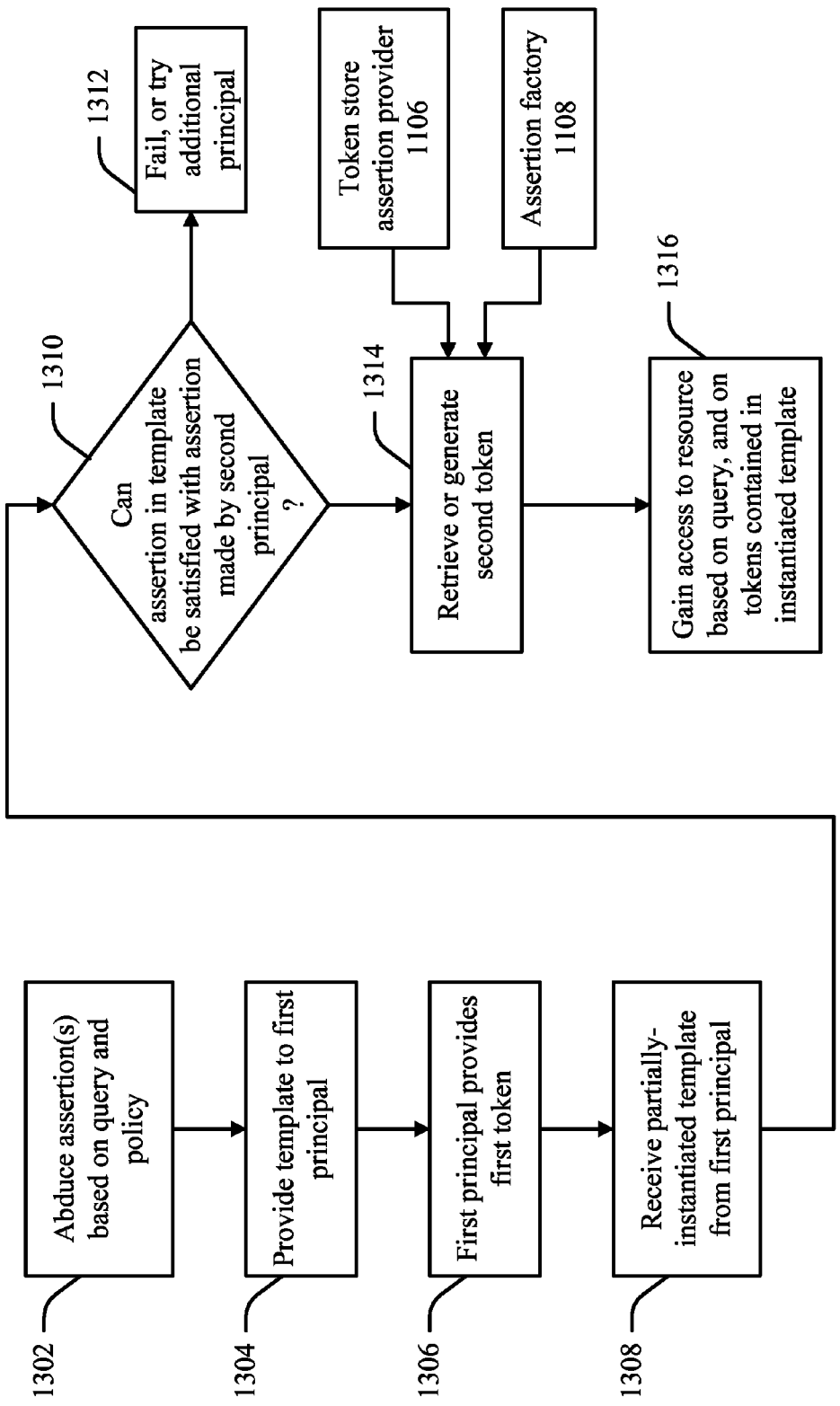
FIG. 13 is a flow diagram of an example of a process in which a template may be instantiated by tokens from plural principals.

FIG. 13 shows an example of a process in which a template may be instantiated by tokens from plural principals.

At 1302, assertions may be abduced based on an access query and/or the policy under which the query is to be evaluated. As in FIG. 12, abduction is one way to create assertions, but the assertions may be created in any manner.

At 1304, a template that specifies assertions (e.g., the assertions generated at 1302) is provided to a first principal. The first principal may be a principal who could have (or could generate) tokens to satisfy one or more of the assertions in the template. For example, if the template contains the assertion "Joe says Bob read foo.txt", then the principal to whom the template is provided at 1304 may be Joe. The principal who receives the template at 1304 may attempt to instantiate, or to partially instantiate, the template.

At 1306, the first principal provides a token (labeled "first token") that satisfies one of the assertions in the template. If there are additional assertions to be satisfied in the template, then the template, at this point, is partially instantiated. The partially instantiated template is then received by a second principal from the first principal (at 1308).

It is then determined (at 1310) whether an unsatisfied assertion in the template can be satisfied with a token from the second principal. If the answer is no, then either the attempt to instantiate the template fails, or the process may try another principal to determine if such other principal can provide the right token(s) (at 1312). If a token from the second principal could satisfy an assertion in the template, then, at 1314, a token that satisfies the assertion (labeled "second token") is either retrieved (e.g., from token store assertion provider 1106), or generated (e.g., by assertion factory 1108). If unsatisfied assertions in the template remain, then the process may continue to obtain other tokens (either from the first or second principals mentioned, or from other principals), until the template is fully instantiated. (Plural templates may be processed simultaneously, such that success is achieved when any one of the templates is fully instantiated.) At that point, access to the resource is gained, based on the query and on the tokens contained in the instantiated template (at 1316).

Figure 14:
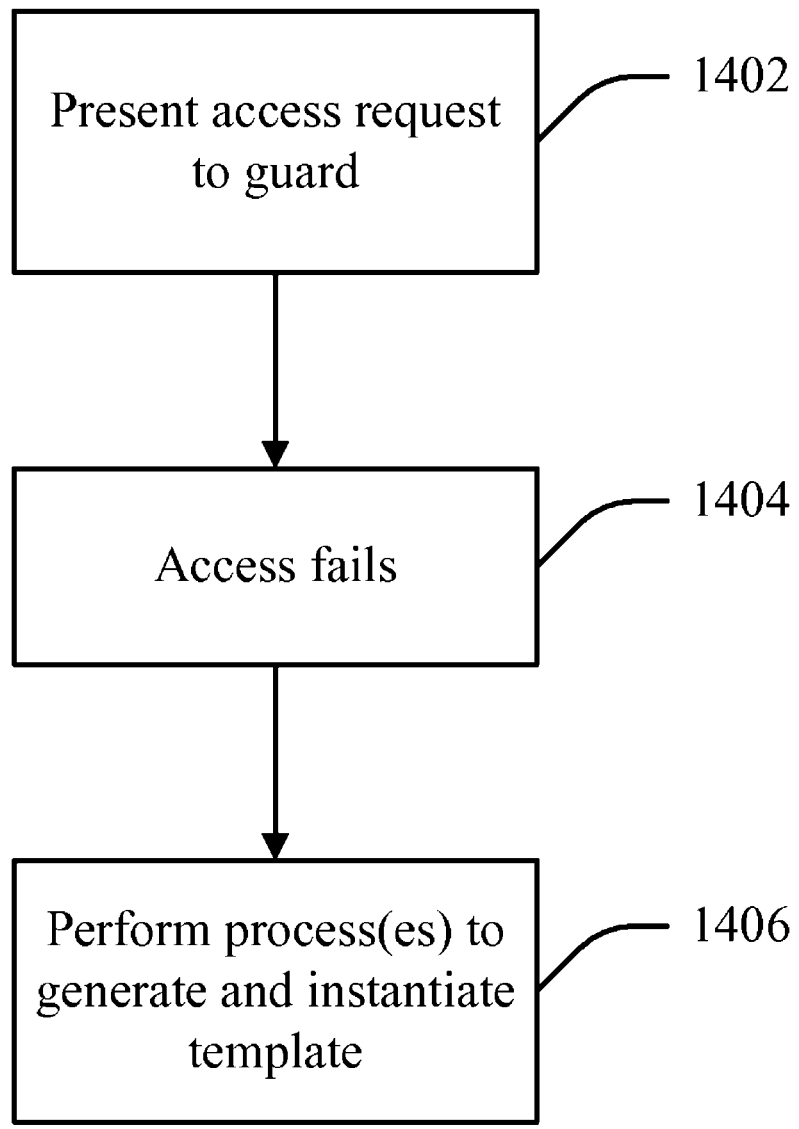
FIG. 14 is a flow diagram of an example process in which a template is created an instantiated to help to debug a failed access request.

One context in which a template may be used is to help to debug an access request that has failed. FIG. 14 shows an example process in which a template is created and instantiated to help to debug a failed access request. At 1402, an access request is presented to the guard. At 1404, the request fails. The failure may be due, for example, to the absence of tokens to support the query associated with the access request. At 1406, a process (or plural processes) is performed to create and instantiate a template. Processes described above may be used to create and instantiate the template, although any process(es) may be used.

In addition to debugging a failed access request, the mechanisms and techniques shown herein may also be used to obtain tokens to support an access request for any reason and in any context. For example, these mechanism and techniques could be used proactively to obtain the tokens to support an access request.

Figure 15:
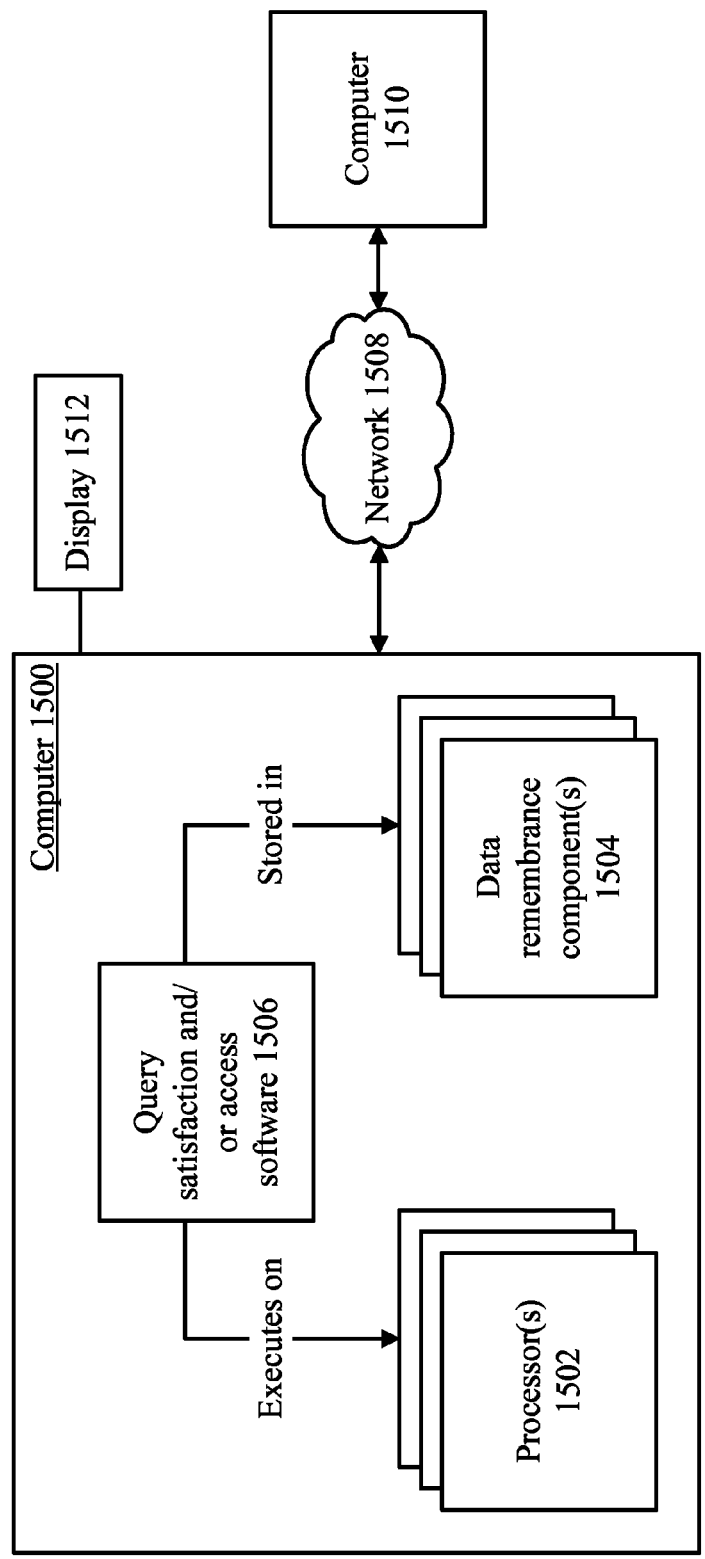
FIG. 15 is a block diagram of example components that may be used in connection with implementations of the subject matter described herein.

FIG. 15 shows an example environment in which aspects of the subject matter described herein may be deployed.

Computer 1500 includes one or more processors 1502 and one or more data remembrance components 1504. Processor(s) 1502 are typically microprocessors, such as those found in a personal desktop or laptop computer, a server, a handheld computer, or another kind of computing device. Data remembrance component(s) 1504 are devices that are capable of storing data for either the short or long term. Examples of data remembrance component(s) 1504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 1500 may comprise, or be associated with, display 1512, which may be a cathode ray tube (CRT) monitor, a liquid crystal display (LCD) monitor, or any other type of monitor. Display 1512 is an example of a communications component.

Software may be stored in the data remembrance component(s) 1504, and may execute on the one or more processor(s) 1502. An example of such software is query satisfaction and/or access software 1506, which may implement some or all of the functionality described above in connection with FIGS. 1-14, although any type of software could be used. Software 1506 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 15, although the subject matter described herein is not limited to this example.

The subject matter described herein can be implemented as software that is stored in one or more of the data remembrance component(s) 1504 and that executes on one or more of the processor(s) 1502. As another example, the subject matter can be implemented as software having instructions to perform one or more acts, where the instructions are stored on one or more computer-readable storage media.

In one example environment, computer 1500 may be communicatively connected to one or more other devices through network 1508. Network 1508, and/or any interface through which computer 1500 interacts with network 1508, are examples of communications components. Computer 1510, which may be similar in structure to computer 1500, is an example of a device that can be connected to computer 1500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable memories having stored thereon executable instructions to perform a method of facilitating access to a resource, the method comprising:

abducing a first set of one or more assertions from information that comprises an access request for a first principal to access the resource, a system that performs said abducing not having in possession said first set of one or more assertions, said abducing being performed by acts comprising:
   receiving a first answer set and a second answer set, said first answer set comprising said first set of one or more assertions, said second answer set comprising a second set of one or more assertions, said first set of said one or more assertions and said second set of said one or more assertions each satisfying a condition that either said first set of one or more assertions or said second set of one or more assertions will, when presented to a guard of the resource, cause said guard to find that a query evaluates to true under a policy implemented by said guard; and
   determining that said first answer set is not subsumed by said second answer set;
receiving a template that specifies said first set of one or more assertions;
obtaining a first token that satisfies a first one of said first set of one or more assertions;
presenting, to said guard, (a) a set of one or more tokens that comprises said first token, and (b) said access request;
receiving access to said resource from said guard; and
accessing said resource.

2. The one or more computer-readable memories of claim 1, wherein said obtaining comprises:
consulting a token store that contains said first token;
determining that said first token satisfies said first one of said first set of one or more assertions; and
retrieving said first token from said token store.

3. The one or more computer-readable memories of claim 1, wherein said obtaining comprises:
generating said first token and signing said first token with a key of a second principal, or requesting the token from a token authority.

4. The one or more computer-readable memories of claim 1, wherein said first one of said first set of one or more assertions involves a variable, wherein said template specifies a constraint on a value of said variable, and wherein the method further comprises:
determining that said first token comprises a constant that satisfies said constraint.

5. The one or more computer-readable memories of claim 1, wherein said template specifies a constraint on a variable involved in said first one of said first set of one or more assertions, said constraint being satisfiable with a set or range of values, and wherein the method further comprises:
choosing one of said values to substitute in said variable based on a principle.

6. The one or more computer-readable memories of claim 1, wherein said obtaining comprises:
determining, under a rule, that generating said first token on behalf of a second principal is acceptable;
generating said first token; and
signing said first token by, or on behalf of, said second principal.

7. The one or more computer-readable memories of claim 1, wherein said first token is received at a second principal, wherein said first token partially instantiates said template which constitutes a partially-instantiated template, and wherein the method further comprises:
communicating the partially-instantiated template to said second principal.

8. A method of facilitating access to a resource, the method comprising:
using a processor to perform acts comprising:
   abducing a first plurality of assertions from information that comprises an access request and a policy under which a guard controls access to the resource, a system that performs said abducing not having in possession said first plurality of assertions, said abducing being performed by acts comprising:
      receiving a first answer set and a second answer set, said first answer set comprising said first plurality of assertions, said second answer set comprising a second plurality of assertions, said first plurality of assertions and said second plurality of assertions each satisfying a condition that either said first plurality of assertions or said second plurality of assertions will, when presented to a guard of the resource, cause said guard to find that a query evaluates to true under a policy implemented by said guard; and
      determining that said first answer set is not subsumed by said second answer set;
   receiving, from a first principal, a template that specifies said first plurality of assertions and that further specifies a first token that satisfies a first one of said first plurality of assertions;
   determining from the template that a second one of said first plurality of assertions can be satisfied by a second token containing an assertion made by a second principal;
   retrieving or generating said second token;
   sending the guard of the resource said access request which includes a set of tokens which satisfy the template; and
   gaining access to the resource based on the request.

9. The method of claim 8, wherein said assertion involves a variable, wherein said template specifies a constraint on said variable, and wherein said determining comprises
determining a constant that, when substituted in place of said variable in said assertion, satisfies said constraint.

10. The method of claim 8, wherein said acts further comprise:
using a key of said second principal to sign said second token.

11. The method of claim 8, wherein said acts further comprise:
using a rule to determine that said second one of said first plurality of assertions may be made on behalf of said second principal.

12. The method of claim 8, wherein said acts further comprise:
prior to said receiving, presenting said access request to a guard that controls access to the resource;
receiving an indication of a failure to access the resource; and
requesting that said template be generated.

13. A system comprising:
one or more data remembrance components;
one or more processors;
a template stored in said one or more data remembrance components, said template specifying a first set of one or more assertions;
one or more executable components that are stored in said one or more data remembrance components, and that execute on said one or more processors, and that retrieve or generate a first token that satisfies a first one of said first set of one or more assertions, and that create a first data structure that comprises one or more tokens that, together with an access request, allow a first principal to access a resource to be true under a policy, said one or more tokens comprising said first token;

a guard that evaluates said first data structure and determines whether to allow said first principal access to said resource based on said access request and said one or more tokens; and an abduction component that abduces said first set of one or more assertions from information that comprises an access request for said first principal to access the resource, said abduction component not having in possession said first set of one or more assertions, said abduction component abducing said first said of one or more assertions by:

receiving a first answer set and a second answer set, said first answer set comprising said first set of one or more assertions, said second answer set comprising a second set of one or more assertions, said first set of said one or more assertions and said second set of said one or more assertions each satisfying a condition that either said first set of one or more assertions or said second set of one or more assertions will, when presented to said guard, cause said guard to find that a query evaluates to true under a policy implemented by said guard; and determining that said first answer set is not subsumed by said second answer set.

14. The system of claim 13, further comprising:

a token store that stores a plurality of tokens, including said first token, wherein said one or more executable components comprise an assertion provider that makes a determination that said first token satisfies said first one of said first set of one or more assertions and retrieves said first token from said token store based on said determination.

15. The system of claim 13, wherein said first one of said first set of one or more assertions involves a variable, wherein said template comprises a constraint on said variable, and wherein the system further comprises:

a constraint solver that finds a constant that satisfies said constraint to substitute in place of said variable.

16. The system of claim 15, wherein there is a set or range of values that satisfy said constraint, and wherein said constraint solver chooses one or said values to substitute in place of said variable based on a principle.

17. The system of claim 13, wherein said first token comprises an assertion made by a second principal, and wherein said one or more executable components provide said first data structure to a third principal that is able to provide, or has provided, a second token that satisfies a second one of said first set of one or more assertions.

18. The system of claim 13, wherein said one or more executable components generate said first token by signing said first token with a key associated with a second principle by whom, or on whose behalf, an assertion contained in said first token is made.

19. The one or more computer-readable memories of claim 1, said determining that said first answer set is not subsumed by said second answer set comprising:

determining whether the number of abduced assertions in the first answer set is greater than the number of abduced assertions in the second answer set; and determining whether a substitution exists such that:

the first answer set is logically equivalent to the second answer set when variables in said first answer set and said second answer set are substituted according to the substitution; and the first set of one or more assertions is a superset of the second set of one or more assertions when variables in said first answer set and said second answer set are substituted according to the substitution.

* * * * *